(12) United States Patent
Takahashi et al.

(10) Patent No.: US 8,342,849 B2
(45) Date of Patent: Jan. 1, 2013

(54) DISPLAY UPDATING PROGRAM AND DISPLAY UPDATING APPARATUS

(75) Inventors: Shinya Takahashi, Kyoto (JP); Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1169 days.

(21) Appl. No.: 11/783,208

(22) Filed: Apr. 6, 2007

(65) Prior Publication Data

US 2007/0288243 A1 Dec. 13, 2007

(30) Foreign Application Priority Data

Apr. 12, 2006 (JP) ................................. 2006-109981

(51) Int. Cl.
*G09B 5/00* (2006.01)
(52) U.S. Cl. .................... 434/169; 434/156; 434/157
(58) Field of Classification Search ................ 434/185, 434/165, 157, 156; 704/2, 1
See application file for complete search history.

(56) References Cited

U.S. PATENT DOCUMENTS

| | | | | |
|---|---|---|---|---|
| 4,135,314 A | * | 1/1979 | Yamamoto | 434/157 |
| 4,541,069 A | * | 9/1985 | Kanou et al. | 704/7 |
| 4,597,056 A | * | 6/1986 | Washizuka | 704/3 |
| 4,644,492 A | * | 2/1987 | Murata | 704/3 |
| 4,658,374 A | * | 4/1987 | Tanimoto et al. | 704/3 |
| 4,774,666 A | * | 9/1988 | Miyao et al. | 704/2 |
| 4,912,671 A | * | 3/1990 | Ishida | 704/3 |
| 5,148,296 A | * | 9/1992 | Takashima | 358/482 |
| 5,184,296 A | * | 2/1993 | Matsumoto | 704/2 |
| 5,377,997 A | * | 1/1995 | Wilden et al. | 463/43 |
| 5,523,943 A | * | 6/1996 | Maruta et al. | 704/4 |
| 5,697,789 A | * | 12/1997 | Sameth et al. | 434/157 |
| 5,868,576 A | * | 2/1999 | Maruta | 434/157 |
| 5,888,071 A | * | 3/1999 | Takamori | 434/156 |
| 6,002,915 A | * | 12/1999 | Shimizu | 434/350 |
| 6,012,037 A | * | 1/2000 | Yoshikawa | 705/8 |

(Continued)

FOREIGN PATENT DOCUMENTS

JP 09-101737 4/1997

(Continued)

OTHER PUBLICATIONS

"Integrated Office system TOPS Introduction", Toshiba Co. Ltd., Jan. 30, 1993, R1st ed., p. 118-119 (especially, at the lower part of p. 119, a paragraph of "function menu of MEMO behavior support".

*Primary Examiner* — Robert J Utama
(74) *Attorney, Agent, or Firm* — Nixon & Vanderhye P.C.

(57) ABSTRACT

A game machine has an LCD, a cross key, and a memory. The memory stores a plurality of words and a plurality of translations each corresponding to the plurality of words. A computer of the game machine displays at least one of the plurality of words on the LCD, and updatedly displays on the LCD a word which is being displayed on the LCD by being changed to another word in response to an operation of a certain push portion of a cross key. The translation of the word which is thus being displayed on the LCD is updatedly displayed in place of the word during a period from accepting an operation of another push portion of the cross key to cancelling the operation, and when the operation is cancelled, the word which was displayed on the LCD before the operation is displayed in place of the translation which is being displayed on the LCD.

22 Claims, 14 Drawing Sheets

U.S. PATENT DOCUMENTS

| | | | |
|---|---|---|---|
| 6,302,695 B1 * | 10/2001 | Rtischev et al. | 434/157 |
| 6,353,447 B1 * | 3/2002 | Truluck et al. | 715/733 |
| 6,549,929 B1 * | 4/2003 | Sullivan | 718/102 |
| 6,565,358 B1 * | 5/2003 | Thomas | 434/157 |
| 6,581,039 B2 * | 6/2003 | Marpe et al. | 705/7 |
| 2002/0001793 A1 * | 1/2002 | Kashima | 434/350 |
| 2002/0064767 A1 * | 5/2002 | McCormick et al. | 434/396 |
| 2002/0150868 A1 * | 10/2002 | Yui et al. | 434/156 |
| 2003/0232312 A1 * | 12/2003 | Newsom et al. | 434/157 |
| 2006/0014128 A1 * | 1/2006 | Mizuno | 434/307 R |
| 2007/0121823 A1 * | 5/2007 | Rhie et al. | 379/88.14 |
| 2008/0280269 A1 * | 11/2008 | Yeung et al. | 434/157 |

FOREIGN PATENT DOCUMENTS

| | | |
|---|---|---|
| JP | 10-105558 | 4/1998 |
| JP | 11-095896 | 4/1999 |
| JP | 2001-265205 | 9/2001 |
| JP | 2002-132126 | 5/2002 |
| JP | 2002-200335 | 7/2002 |
| JP | 2005-275543 | 10/2005 |

* cited by examiner

FIG. 4

| SERIAL NUMBER DATA (78) | ENGLISH TEXT DATA (80) | JAPANESE TEXT DATA (82) | ASSOCIATION DATA (SERIAL NUMBER OF DICTIONARY) (84) |
|---|---|---|---|
| 1 | abondon | 捨てるSUTERU (JAPANESE LANGUAGE) | 5 |
| 2 | absorb | 吸収するKYUUSYUUSURU (JAPANESE LANGUAGE) | 15 |
| 3 | abundant | 豊富な HOUHUNA (JAPANESE LANGUAGE) | 20 |
| ... | ... | ... | ... |
| N | yield | 算出するSANSYUTUSURU (JAPANESE LANGUAGE) | 980 |

| SERIAL NUMBER DATA (88) | ENGLISH AND JAPANESE TEXT DATA (90) |
|---|---|
| 1 | a, an /ある、ひとつの…ARU, HITOTSUNO(JAPANESE LANGUAGE), …/ア、アン A, AN (JAPANESE LANGUAGE IN KATAKANA) |
| ... | ... |
| 5 | abandon /捨てる、諦める、SUTERU, AKIRAMERU…(JAPANESE LANGUAGE)/アバンドンABANDON (JAPANESE LANGUAGE IN KATAKANA) |
| ... | ... |
| 15 | absorb/吸収する、夢中になる、…KYUUSYUUSRU, MUTYUNINARU (JAPANESE LANGUAGE)/アブゾーブ ABUZOBU (JAPANESE LANGUAGE IN KATAKANA) |
| ... | ... |
| M | zoology/動物学 DOBUTUGAKU(JAPANESE LANGUGAE)/ズーロジイZULOZI (JAPANESE LANGUAGE IN KATAKANA) |

86

FIG. 6
(A)
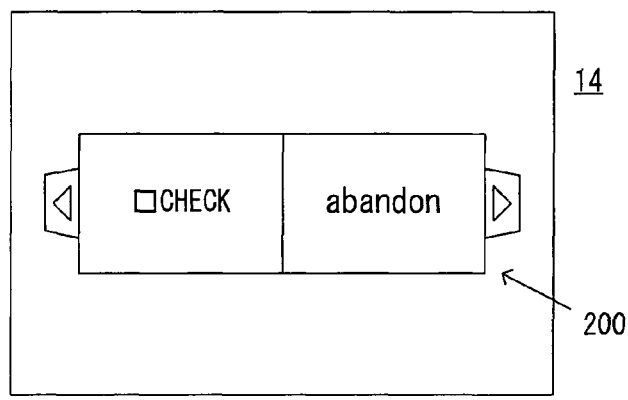
(B)
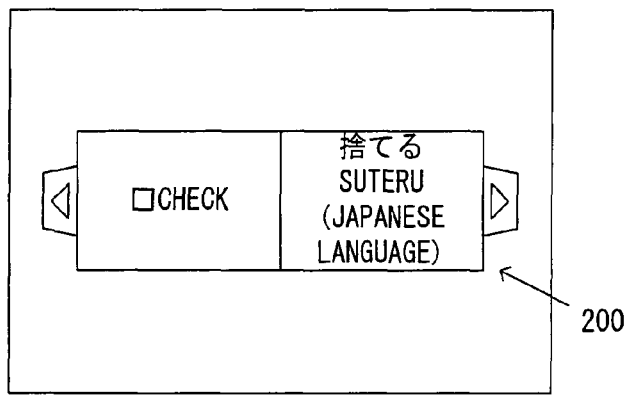
(C)
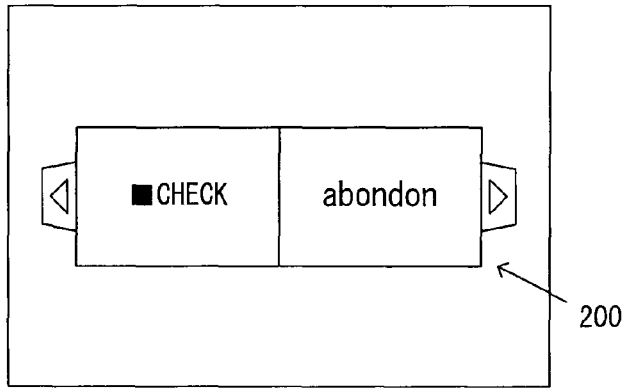
(D)
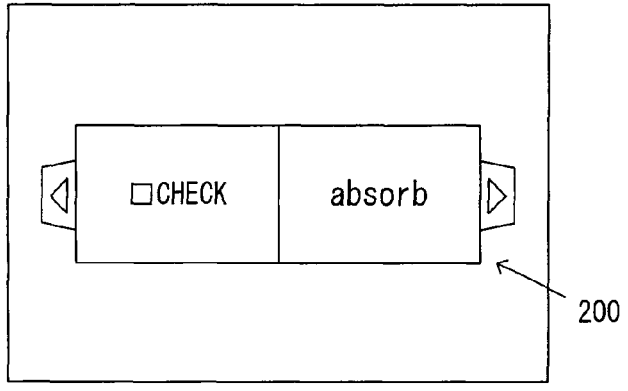

| SERIAL NUMBER ORDER DATA 100 | CHECK FLAG 102 |
|---|---|
| 1 | ON |
| 2 | OFF |
| 3 | OFF |
| ... | ... |
| N | OFF |

(ORIGINAL ORDER)

(B)

| SERIAL NUMBER ORDER DATA 100 | CHECK FLAG 102 |
|---|---|
| 2 | OFF |
| 3 | OFF |
| ... | ... |
| N | OFF |

(CHECK MODE : ON)

| SERIAL NUMBER ORDER DATA 100 | CHECK FLAG 102 |
|---|---|
| 25 | OFF |
| 1 | ON |
| N | OFF |
| ... | ... |
| 3 | OFF |

(ORDER AFTER SHUFFLE)

(B)

| SERIAL NUMBER ORDER DATA 100 | CHECK FLAG 102 |
|---|---|
| 25 | OFF |
| N | OFF |
| ... | ... |
| 3 | OFF |

(CHECK MODE : ON)

FIG. 10
(A)
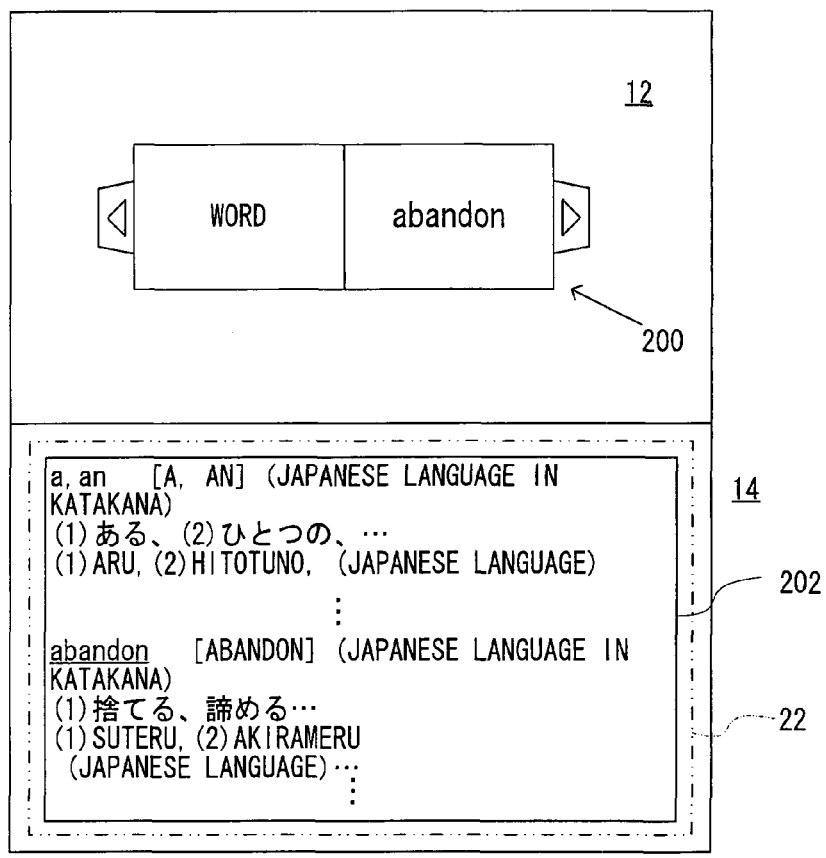
(B)
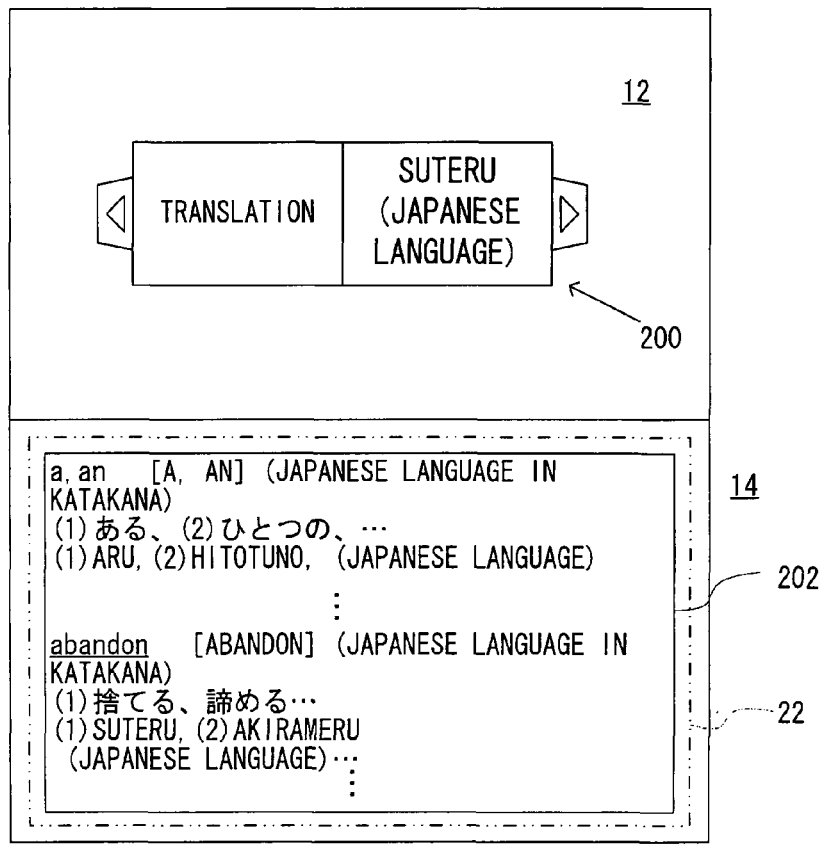

FIG. 15
(A)
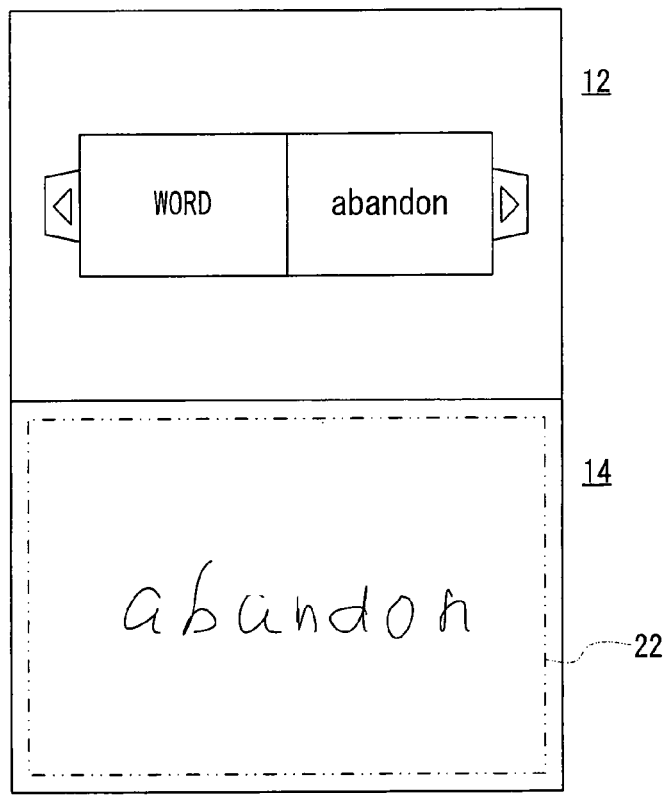
(B)
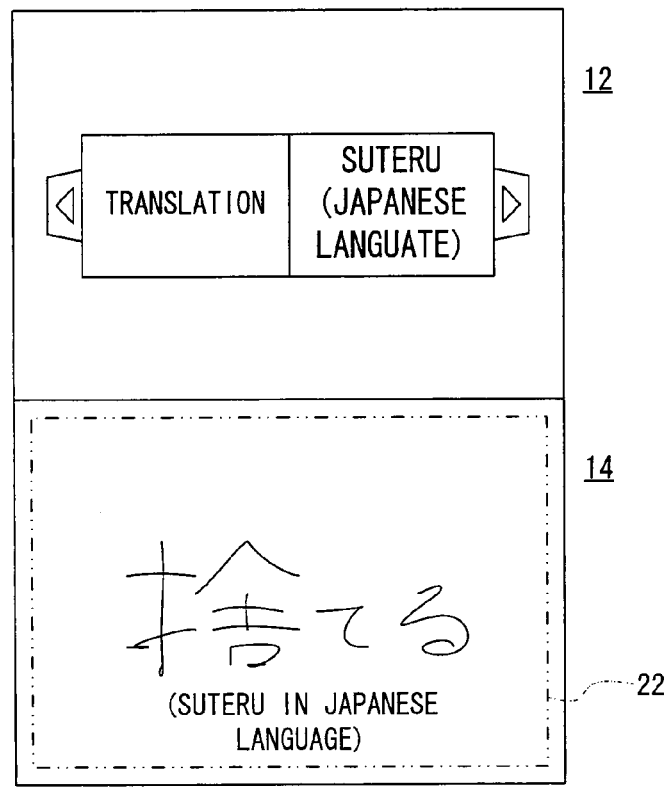

FIG. 16 (A)
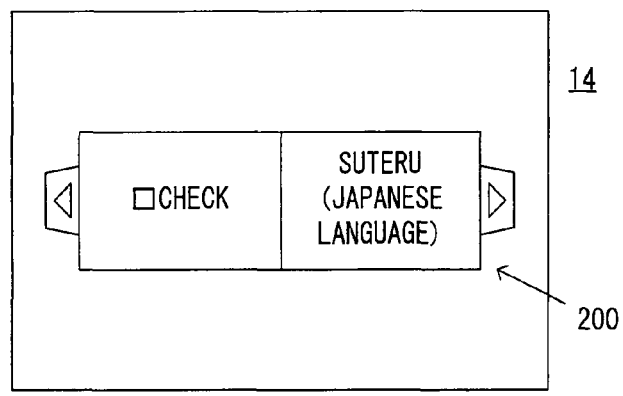
(B)
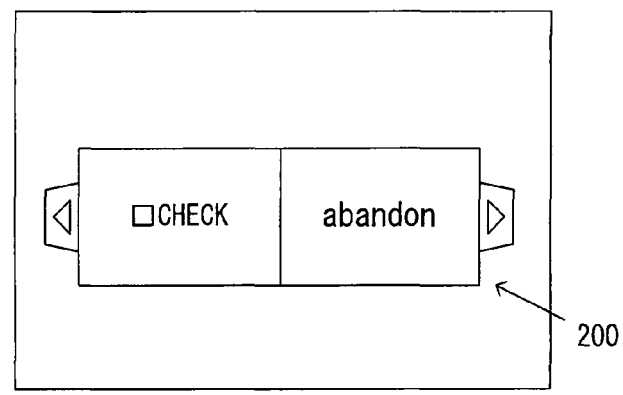
(C)
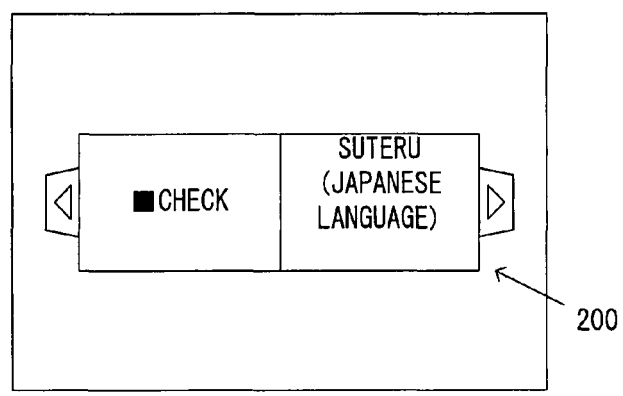
(D)
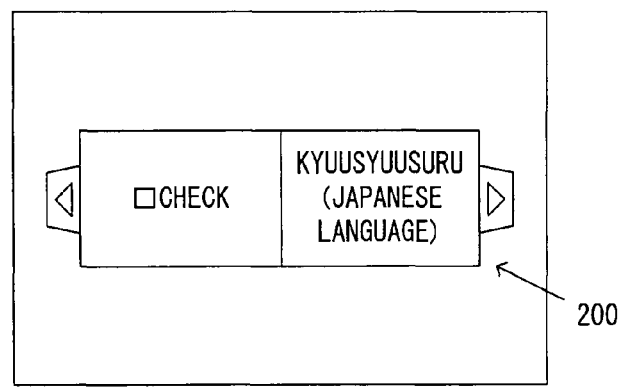

DISPLAY UPDATING PROGRAM AND DISPLAY UPDATING APPARATUS

CROSS REFERENCE OF RELATED APPLICATION

The disclosure of Japanese Patent Application No. 2006-109981 is incorporated herein by reference.

BACKGROUND OF THE INVENTION

1. Field of the Invention

The present invention relates to a learn display updating program and a learn display updating apparatus. More specifically, the present invention relates to a learn display updating program and a learn display updating apparatus for learning words.

2. Description of the Related Art

Conventionally, as an apparatus for learning words, one disclosed in Japanese Patent Laying-open No. 2004-5762 has been known. In the related art, a next or a previous word is displayed in response to an operation by an up and down cursor key. Furthermore, an execution key is pushed in a state an arbitrary word is displayed, the translation of the word is displayed.

By the way, for learning words like English words and kanji characters, flip-cards are often utilized. The flip-cards are made up of a plurality of sheets of paper each describing a word and the translation (how to read) on the front surface and the reverse surface, respectively. Generally, a learner first looks at a word on the front surface to remember the translation, and turns over the sheet to take a glimpse of the translation if he or she does not remember it and returns it back to check whether or not the word on the front side is memorized. When one word is memorized, the process is moved to a next word to perform a similar work. If the learner is not completely certain to memorize it, the process is returned to the previous word to repeat a similar work.

However, in the related art, such a work is hard to perform. Even if it is performed, an operation of pushing the execution key corresponds to an operation of turning over a sheet, and therefore, the execution key has to be pushed frequently, resulting in low operability. As a result, an effective learning cannot be performed.

In addition, in a case that a display content is updated, a key, etc. has often to be operated without being limited to the apparatus for learning words, and an update to suit preferences or situations of the user cannot sometimes be performed.

SUMMARY OF THE INVENTION

Therefore, disclosed herein is a novel display updating program and a display updating apparatus.

A display updating program and a display updating apparatus is disclosed herein having high operability, and is especially to provide a display updating program and a display updating apparatus capable of making an effective learning.

A display updating program according to a first embodiment of the invention disclosed herein causes a computer (42) of an information processor (10: reference numeral designating a portion corresponding in the embodiments) to execute a first display step (S9, S11), a second display step (S79), and third display step (S93, S95). The information processor has a display (12, 14) for displaying information, an operator (20) for accepting a direction instructing operation, and a memory (28) storing a first information group formed by a plurality of data and a second information group formed by a plurality of data each corresponding to the plurality of data of the first information group.

The first display step displays at least one data of the first information group on the display. The second display step updatedly displays on the display the data of the first information group which is being displayed on the display by the first display step by being changed to another data of the first information group in response to a first direction instructing operation indicative of a first direction (X) by the operator.

The third display step updatedly displays on the display data of the second information group corresponding to the data of the first information group which is being displayed on the display by the first display step or the second display step in place of the data of the first information group during a period from accepting a second direction instructing operation indicative of a second direction (Y) by the operator to cancelling the second direction instructing operation, and updatedly displays on the display the data of the first information group which was displayed on the display before accepting the second direction instructing operation in place of the data of the second information group which is being displayed on the display when the second direction instructing operation is canceled.

In the first embodiment of the invention, each of the first direction instructing operation indicative of the first direction and the second direction instructing operation indicative of the second direction is accepted by the operator. At least one data of the first information group is displayed on the display by a first display step. The data of the first information group which is being displayed by the first display step is updatedly displayed on the display by being changed to another data of the first information group in response to a first direction instructing operation.

The data of the second information group corresponding to the data of the first information group which is being displayed on the display by the first display step or the second display step is displayed on the display in place of the data of the first information group during a period from accepting a second direction instructing operation to cancelling the second direction instructing operation, and when the second direction instructing operation is canceled, the data of the first information group which was displayed on the display before accepting the second direction instructing operation is updatedly displayed on the display in place of the data of the second information group which is being displayed on the display.

According to the first embodiment of the invention, the data of the first information group which is being displayed on the display is updated to the corresponding data of the second information group in response to a second direction instructing operation, and the data of the second information group thus updatedly displayed is updated to the original data of the first information group by merely canceling the second direction instructing operation, capable of reducing the number of operations. Furthermore, in a case that the invention is applied to a program for learning words, an effective learning can be performed. In a case of utilizing actual flip-cards, two movements like turning over a sheet of paper to look a translation and returning the reversed paper when the translation on the reverse side is to be looked, for example, and in the conventional word learning device, at least two operations are required. However, in response to the first direction instructing operation, the above-described data of the first information group is updatedly displayed, and the corresponding data of the second information group is displayed in place of the data of the first information group during accepting a second direction instructing operation to cancelling the second direction instructing operation, and therefore, it is possible to provide a more conventional operation than that in the actual flip-cards and the conventional word learning device. In addition, an operation of updating the display of the data of the first information group and an operation of updating the display of the data of the second information group are performed by a direction instructing operation, and therefore, it is possible to realize various updating displays with the game machine 10 held in one hand.

A display updating program according to a second embodiment of the invention is dependent on the first embodiment of the invention, and causes the computer to further execute a fourth display step (S85). The data of the first information group is defined by a predetermined order, and the second display step updatedly displays on the display the data of the first information group which is being displayed on the display by the first display step by being changed to next data on the basis of the order in response to the first direction instructing operation. The fourth display step updatedly displays on the display the data of the first information group which is being displayed on the display by the first display step or the second display step by being changed to previous data on the basis of the order in response to a third direction instructing operation indicative of a third direction by the operator.

According to the second embodiment of the invention, it is possible to updatedly display the data of the first information group which is being displayed on the display in a forward direction or a reverse direction.

A display updating program according to a third embodiment of the invention is dependent on the second embodiment of the invention, and causes the computer to further execute a fourth display step (S99). The memory further stores a third information group formed by a plurality of data each corresponding to the plurality of data of the first information group.

The fourth display step displays data of the third information group corresponding to the data of the first information group which is being displayed on the display in association with display processing of the first display step or the second display step when a fourth direction instructing operation indicative of a fourth direction is accepted by the operator.

In the third embodiment of the invention, a fourth direction instructing operation indicative of the fourth direction is also accepted by the operator. The data of the third information group corresponding to the data of the first information group which is being displayed on the display in association with the display processing of the first display step or the second display step is displayed on the display in response to the fourth direction instructing operation by the fourth display step.

According to the third embodiment of the invention, displaying the third information group data in response to the fourth direction instructing operation allows various information displays, capable of performing a more effective learning.

A display updating program according to a fourth embodiment of the invention is dependent on the third embodiment of the invention, and the second direction is a direction opposite to the first direction, the third direction is a direction vertical to the first direction, and the fourth direction is a direction opposite to the third direction.

A display updating program according to a fifth embodiment of the invention is dependent on the fourth embodiment of the invention, and the operation includes a cross key (20a). The cross key has a first end portion (a1), a second end portion (a2), a third end portion(a3), and a fourth end portion (a4). The first end portion and the second end portion are arranged along the first direction. The third end portion and the fourth end portion are arranged along the third direction. The first direction instructing operation is an operation for pushing the first end portion, the second direction instructing operation is an operation of pushing the second end portion, the third direction instructing operation is an operation of pushing the third end portion, and the fourth direction instructing operation is an operation of pushing the fourth end portion.

According to the fifth embodiment of the invention, operability is enhanced, capable of easily performing an operation with one hand.

A display updating program according to a sixth embodiment of the invention is dependent on any one of the first to the fifth embodiments of the invention. The plurality of data forming the first information group are a plurality of word data, and the plurality of data forming the second information group are a plurality of translation data each corresponding to the plurality of word data.

A display updating program according to a seventh embodiment of the invention is dependent on the sixth embodiment of the invention. The plurality of translation data forming the third information group are a plurality of dictionary data each corresponding to the plurality of word data.

A display updating program according to an eighth embodiment of the invention is dependent on the seventh embodiment of the invention. Each of the plurality of word data is described by one of a first language and a second language, and each of the plurality of translation data is described by the other of the first language and the second language.

According to the sixth to the eighth embodiments of the invention, it is possible to obtain a realistic learning environment by the combined use of flip-cards list and a dictionary.

A display updating program according to a ninth embodiment of the invention is dependent on the eighth embodiment of the invention, and causes the computer to further execute a switching step (S57, S59). The switching step switches a description language of a word to be displayed by the first display step between the first language and the second language in response to a mode switching operation.

In the ninth embodiment of the invention, a description language of a word to be displayed by the first display step is switched between the first language and the second language in response to a mode switching operation.

According to the ninth embodiment of the invention, switching the description language between the word and the translation as necessary further enhances a learning effect.

A display updating program according to a tenth embodiment of the invention is dependent on any one of the first to ninth embodiments of the invention, and causes the computer to further execute an accepting step (S111, S115) and a storing step (S113, S117). The accepting step accepts an input operation of inputting a set of a desired first information group and a desired second information group. The storing step stores the set of first information group and second information group accepted by the accepting step in the memory.

In the tenth embodiment of the invention, an input operation for inputting a set of desired first information group and desired second information group is accepted by an accepting step, and the accepted set of first information group and second information group is stored in the memory by the storing step.

According to the tenth embodiment of the invention, it is possible to create flip-cards on which a desired first information group and a desired second information group are described, allowing an effective learning by means of the flip-cards made by the user.

A display updating program according to an eleventh embodiment of the invention causes a computer (42) of an information processor (10) to execute a mode setting step (S57, S59), a first display step (S9), a second display step (S11), a third display step (S93), and a fourth display step (S95). The information processor has a display (14) for displaying information, an operator (20) for accepting an instruction operation, and a memory (28) for storing first information and second information corresponding to the first information.

The mode setting step sets any one of a first mode and a second mode. The first display step displays the first information on the display when the first mode is set by the mode setting step. The second display step displays the second information on the display when the second mode is set by the mode setting step. The third display step, when an instruction operation is accepted by the operator in a state that the first information is being displayed on the display by the first display step, displays the second information on the display during a period from accepting the instruction operation to cancelling it. The fourth display step, when an instruction operation is accepted by the operator in a state that the second information is being displayed on the display by the second display step, displays the first information on the display during a period from accepting the instruction operation to cancelling it.

In the eleventh embodiment of the invention, any one of the first mode and the second mode is set by a mode setting step. A first display step displays the first information on the display when the first mode is set, and a second display step displays the second information on the display when the second mode is set.

According to the eleventh embodiment of the invention, if an instruction operation is executed in a state that one of the first information and the second information is displayed, the other of the first information and the second information is displayed, and the information of the latter is erased merely canceling the instruction operation, and therefore, it is possible to realize an effective operation to suit preferences and situations of the user, and reduce the number of operations. Furthermore, in a case that the invention is applied to a program for learning the word, a more effective learning is performed.

A display updating apparatus (10) according to a twelfth embodiment of the invention comprises a display (12, 14) for displaying information, an operator (20) for accepting a direction instructing operation, a memory (28) for storing a first information group formed by a plurality of data and a second information group formed by a plurality of data each corresponding to the plurality of data of the first information group, a first display means (S9, S11), a second display means (S79), and a third display means (S93, S95).

The first display means displays at least one of the plurality of data of the first information group on the display. The second display means updatedly displays on the display the data of the first information group which is being displayed on the display by the first display means by being changed to another data of the first information group in response to a first direction instructing operation indicative of a first direction (X) by the operator.

The third display means updatedly displays on the display data of the second information group corresponding to the data of the first information group which is being displayed on the display by the first display means or the second display means in place of the data of the first information group during a period from accepting a second direction instructing operation indicative of a second direction (Y) by the operator to cancelling the second direction instructing operation, and updatedly displays on the display the data of the first information group which was displayed on the display before accepting the second direction instructing operation in place of the data of the second information group which is being displayed on the display when the second direction instructing operation is canceled.

In the twelfth embodiment of the invention also, similarly to the first embodiment of the invention, the number of operations is reduced. Furthermore, in a case that this embodiment of the invention is applied to a program for learning the word, a more effective learning is performed, and it is possible to provide a more conventional operation than that in the actual flip-cards case and the conventional word learning apparatus. In addition, it is possible to realize a various updating displays even when it is held with one hand.

A display updating apparatus (10) according to a thirteenth embodiment of the invention comprises a display (14) for displaying information, an operator (20) for accepting an instruction operation, a memory (28) for storing first information and second information corresponding to the first information, a mode setting means (S57, S59) for setting any one of a first mode and a second mode, a first display means (S9) for displaying the first information on the display when the first mode is set by the mode setting means, a second display means (S11) for displaying the second information on the display when the second mode is set by the mode setting means, a third display means (S93) for, when an instruction operation is accepted by the operator in a state that the first information is being displayed on the display by the first display means, displaying the second information on the display during a period from accepting the instruction operation to cancelling it, and a fourth display means (S95) for, when an instruction operation is accepted by the operator in a state that the second information is being displayed on the display by the second display means, displaying the first information on the display only during a period from accepting the instruction operation to cancelling it.

In the thirteenth embodiment of the invention also, similarly to the eleventh embodiment of the invention, it is possible to realize an effective operation to suit preferences and situations of the user, and reduce the number of operations. Furthermore, in a case that the embodiment of the invention is applied to a program for learning the word, a more effective learning is performed.

An information display program according to a fourteenth embodiment of the invention causes a computer (42) of an information processor (10) to execute a first display step (S9, S11, S79, S85) and a second display step (S93, S95). The information processor has a display (12, 14) for displaying information, an operator (20) for accepting a direction instructing operation, and a memory (28) for storing a plurality of first information units and a plurality of second information units each corresponding to the plurality of first information units. The first display step sequentially displays the plurality of first information units on the display in response to a first direction instructing operation indicative of a first direction (X) repeatedly accepted by the operator. The second display step displays a second information unit corresponding to the first information unit which is being displayed on the display in association with the display processing by the first display step only during a period from accepting a second direction instructing operation indicative of a second direction (Y) by the operator to cancelling the second direction instructing operation.

In the fourteenth embodiment of the invention, each of the first direction instructing operation indicative of the first direction and the second direction instructing operation indicative of the second direction is accepted by the operator. The plurality of first information units are sequentially displayed on the display in response to a first direction instructing operation repeatedly executed by the first display step. A second information unit corresponding to the first information unit which is being displayed on the display in reference to display processing by such a first display step is displayed on the display by a second display step during a period from accepting the second direction instructing operation to cancelling the second direction instructing operation.

According to the fourteenth embodiment of the invention, if a second direction instructing operation is performed in a state any first information unit is displayed in response to a first direction operation, a second information unit corresponding to the first information unit is displayed, and the second information unit thus displayed is cancelled by merely cancelling the second direction instructing operation, and therefore, it is possible to realize an environment like a realistic learning by means of the flip-cards, and reduce the number of operations. As a result, an effective learning can be performed.

It should be noted that the first information unit is a word, and the second information unit is the translation, for example. Furthermore, the first direction and the second direction are typically vertical with each other. During displaying the second information unit, the first information unit may remain to be displayed or may be erased. In other words, the second information unit may be displayed together with the first information unit or displayed in place of the first information unit.

According to the enembodiments of the invention disclosed herein, it is possible to provide a display updating program and display updating apparatus having a high operability.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing one example of flip-cards data applied to FIG. 1 embodiment;

FIG. 5 is an illustrative view showing one example of dictionary data applied to FIG. 1 embodiment;

FIG. 6(A) is an illustrative view showing one example of an LCD display applied to FIG. 1 embodiment;

FIG. 6(B) is an illustrative view showing another example of the LCD display applied to FIG. 1 embodiment;

FIG. 6(C) is an illustrative view showing the other example of the LCD display applied to FIG. 1 embodiment;

FIG. 6(D) is an illustrative view showing a further example of the LCD display applied to FIG. 1 embodiment;

FIG. 8(A) is an illustrative view showing one example of serial number order data/check flag applied to FIG. 1 embodiment;

FIG. 8(B) is an illustrative view showing another example of the serial number order data/check flag applied to FIG. 1 embodiment;

FIG. 9(A) is an illustrative view showing the other example of the serial number order data/check flag applied to FIG. 1 embodiment;

FIG. 9(B) is an illustrative view showing a further example of the serial number order data/check flag applied to FIG. 1 embodiment;

FIG. 10(A) is an illustrative view showing another example of an LCD display applied to FIG. 1 embodiment;

FIG. 10(B) is an illustrative view showing the other example of the LCD display applied to FIG. 1 embodiment;

FIG. 15(A) is an illustrative view showing one example of an LCD display applied to other embodiment;

FIG. 15(B) is an illustrative view showing another example of the LCD display applied to the other embodiment;

FIG. 16(A) is an illustrative view showing one example of an LCD display applied to FIG. 1 embodiment;

FIG. 16(B) is an illustrative view showing another example of the LCD display applied to FIG. 1 embodiment;

FIG. 16(C) is an illustrative view showing the other example of the LCD display applied to FIG. 1 embodiment; and FIG. 16(D) is an illustrative view showing a further example of the LCD display applied to FIG. 1 embodiment.

DETAILED DESCRIPTION OF THE PREFERRED EMBODIMENTS

Figure 1:
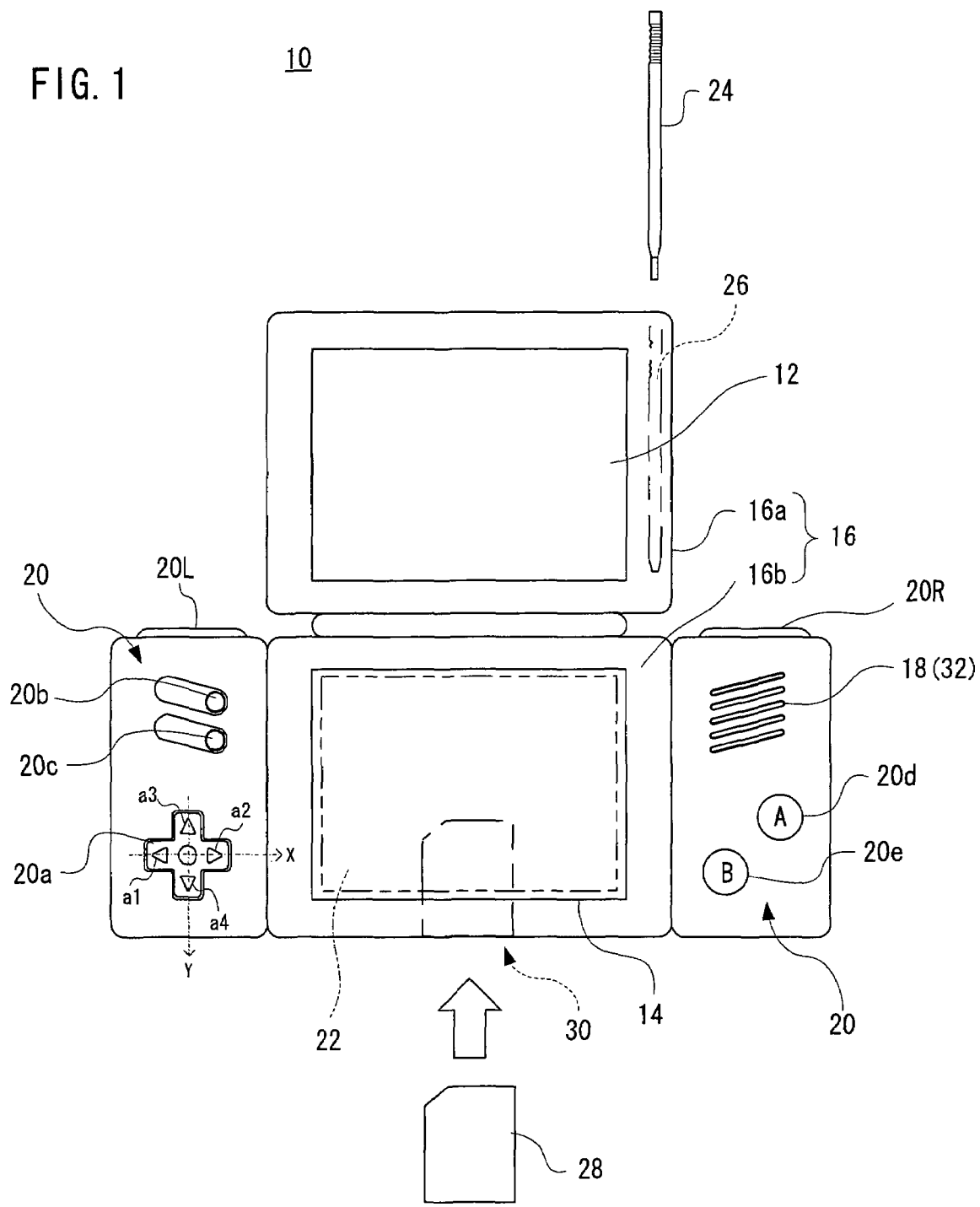
FIG. 1 is an illustrative view showing one embodiment of the present invention.

Referring to FIG. 1, a game apparatus 10 of one embodiment of the present invention includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Also, on the lower housing 16b, a sound release hole 18 is formed, and various operating switches 20 (20a, 20b, 20c, 20d, 20e, 20L and 20R) are provided.

In addition, the upper housing 16a and the lower housing 16b are connected to be rotated at a lower side (lower edge) of the upper housing 16a and a part of an upper side (upper edge) of the lower housing 16b. Accordingly, in a case of not playing a game, for example, if the upper housing 16a is rotated to be folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16*a* and the lower housing 16*b* are not necessarily rotatably connected with each other, and may alternatively be provided integrally (fixedly) to form the housing 16.

The operating switch 20 includes a direction designating switch (cross key) 20*a*, a start switch 20*b*, a select switch 20*c*, an action switch (A button) 20*d*, an action switch (B button) 20*e*, an action switch (L button) 20L, and an action switch (R button) 20R. The switches 20*a*, 20*b* and 20*c* are placed at the left of the LCD 14 on the one main surface of the lower housing 16*b*. Also, the switches 20*d* and 20*e* are placed at the right of the LCD 14 on the one main surface of the lower housing 16*b*. Furthermore, the switches 20L and 20R are placed in a part of an upper edge (top surface) of the lower housing 16*b* at a place except for a connected portion with the upper housing 16*a*, and lie of each side of the connected portion.

The direction designating switch 20*a* functions as a digital joystick. By operating any one of four depression portions a1-a4 arranged left, right, upper and lower directions in this order, it is possible to instruct or designate a moving direction of a player character or player object to be operated by a player and a cursor, and so forth. If learning by the flip-cards is performed, four kinds of display instructions, such as a next word, a previous word, a translation, a detailed explanation can be made. It should be noted that in this embodiment, a direction (right direction) from the pushed portion al to the pushed portion a2 is defined as an X direction, and a direction (downward) from the pushed portion a3 to the pushed portion a4 is defined as a Y direction.

The start switch 20*b* is formed by a push button, and is utilized for starting (restarting), temporarily stopping a game, and so forth. The select switch 20*c* is formed by a push button, and utilized for a game mode selection, etc.

The action switch 20*d*, that is, the A button is formed by a push button, and allows the player character to perform an arbitrary movement (action), except for instructing the direction, such as hitting (punching), throwing, holding (acquiring), riding, jumping, cutting, etc. For example, in an action game, it is possible to apply an instruction of jumping, punching, moving weapon, etc. In a role-playing game (RPG) and a simulation RPG, it is possible to apply an instruction of obtaining items, selecting and determining weapons or commands, etc. The action switch 20*e*, that is, the B button is formed by a push button, and is utilized for changing a game mode selected by the select switch 20*c*, canceling an action determined by the A button 20*d*, and so forth.

The action switch (L button) 20L and the action switch (R button) 20R are formed by push buttons, and the L button 20L and the R button 20R can perform the same operation as the A button 20*d* and the B button 20*e*, and also function as a subsidiary of the A button 20*d* and the B button 20*e*.

Additionally, on a top surface of the LCD 14, a touch panel 22 is provided. As the touch panel 22, any one of kinds of a resistance film system, an optical system (infrared ray system) and an electrostatic capacitive coupling system, for example, can be utilized. In response to an operation by pushing, stroking, touching, hitting, and so forth with a stick 24, a pen (stylus pen), or a finger (hereinafter, referred to as "stick or the like 24") on a top surface of the touch panel 22, the touch panel 22 detects a coordinates position operated (that is, subjected to a touch input) by the stick or the like 24 to output coordinates data corresponding to the detected coordinates.

In addition, a resolution of the display surface of the LCD 14 is 256 dots×192 dots, and a detection accuracy of a detection surface (operation surface) of the touch panel 22 is also rendered as 256 dots×192 dots in correspondence to the resolution of the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an image such as diagram information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, diagram information, an icon, etc. to be displayed on the LCD 14 and select commands by operating the touch panel 22 with the use of the stick or the like 24.

In addition, depending on the kind of the game, the player is able to use the stick or the like 24 for another various input instructions, such as selecting or operating the icon displayed on the LCD 14, instructing a coordinate input, and so forth. In a case that learning by the flip-cards is performed, the stick or the like 24 are utilized for selecting a word (translation) to be registered in the flip-cards from the dictionary displayed on the LCD 14. Furthermore, it can be used for turning a page of the flip-cards displayed on the LCD 14, and checking the stored word.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Furthermore, in this embodiment, the stick 24 can be inserted into a housing portion (slot or concave) 26 provided in proximity to a side surface (right side surface) of the upper housing 16*a*, for example, and taken out therefrom as necessary. However, in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a bottom surface (lower edge) of the lower housing 16*b*. Although omitted in FIG. 1, a connector 46 (see FIG. 2) is provided at a back portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Although not illustrated in FIG. 1, a speaker 32 (see FIG. 2) is provided at a position corresponding to the sound release hole 18 inside the lower housing 16*b*.

Furthermore, although omitted in FIG. 1, a battery accommodating box is provided on a rear surface of the lower housing 16*b*, for example, and a power switch, a volume switch, an external expansion connector, an earphone jack, etc. are provided on a bottom surface of the lower housing 16*b*.

Figure 2:
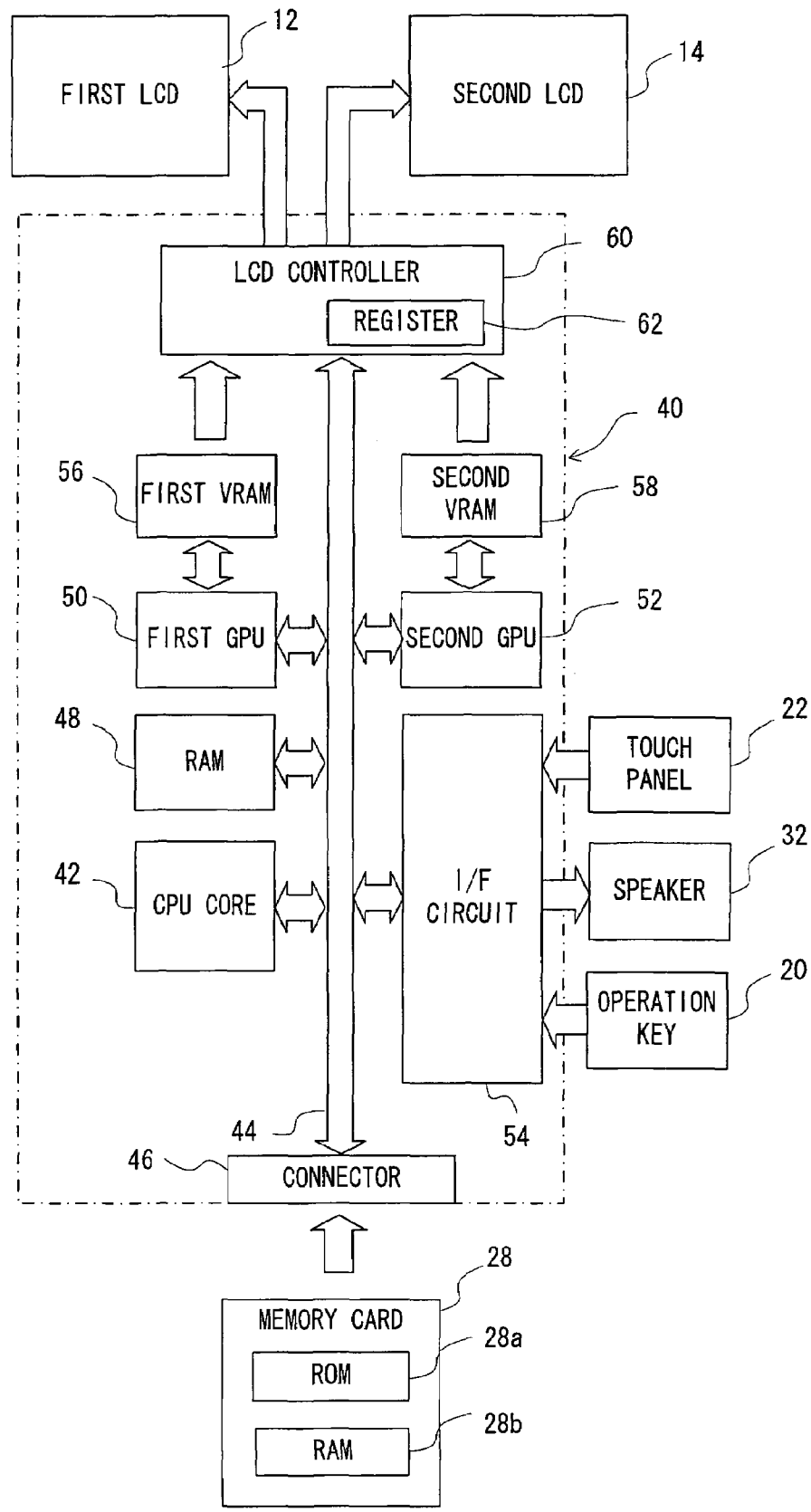
FIG. 2 is a block diagram showing an electric configuration of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, circuit components, such as a CPU core 42, etc. are mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 can access the ROM 28*a* and the RAM 28*b* as described above.

The ROM 28*a* stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28*b* stores (saves) proceeding data and result data of the game.

The RAM 48 is utilized as a buffer memory or a working memory (work RAM). That is, the CPU core 42 loads the game program, the image data, the sound data, etc. stored in the ROM 28*a* of the memory card 28 into the RAM 48, and executes the loaded game program. The CPU core 42 executes a game process while storing data (game data, flag data, etc.) generated or obtained in correspondence with a progress of the game in the RAM 48.

Additionally, the game program, the image data, the sound data, etc. are read from the ROM 28*a* entirely at a time, or partially and sequentially as necessary so as to be stored into the RAM 48.

However, a program as to an application except for the game and image data required to execute the application may be stored in the ROM 28*a* of the memory card 28. In addition, sound (music) data may be stored therein as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate game image data according to the graphics command. The CPU core 42 applies an image generation program (included in the game program) required to generate game image data to both of the GPU 50 and GPU 52 in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. The CPU core 42 reads image data necessary for drawing from the RAM 48, and writes it to the first VRAM 56 and the second VRAM 58 via the GPU 50 and the GPU 52. The GPU 50 accesses the VRAM 56 to generate game image data for display, and stores it in a rendering buffer in the VRAM 56. The GPU 52 accesses the VRAM 58 to produce game image data for drawing, and stores the image data in a drawing buffer of the VRAM 58. A flame buffer, a line buffer, etc. may be employed as a drawing buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

In addition, the LCD controller 60 can directly read the game image data from the VRAM 56 and the VRAM 58, or read the game image data from the VRAM 56 and the VRAM 58 via the GPU 50 and the GPU 52.

Also, the VRAM56 and the VRAM58 may be provided in the RAM 48, or the drawing buffer and a Z buffer may be provided in the RAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game, such as a game music (BGM), a sound effect or voices of a game character (onomatopoeic sound), etc., and outputs it from the speaker 32 via the I/F circuit 54.

Figure 3:
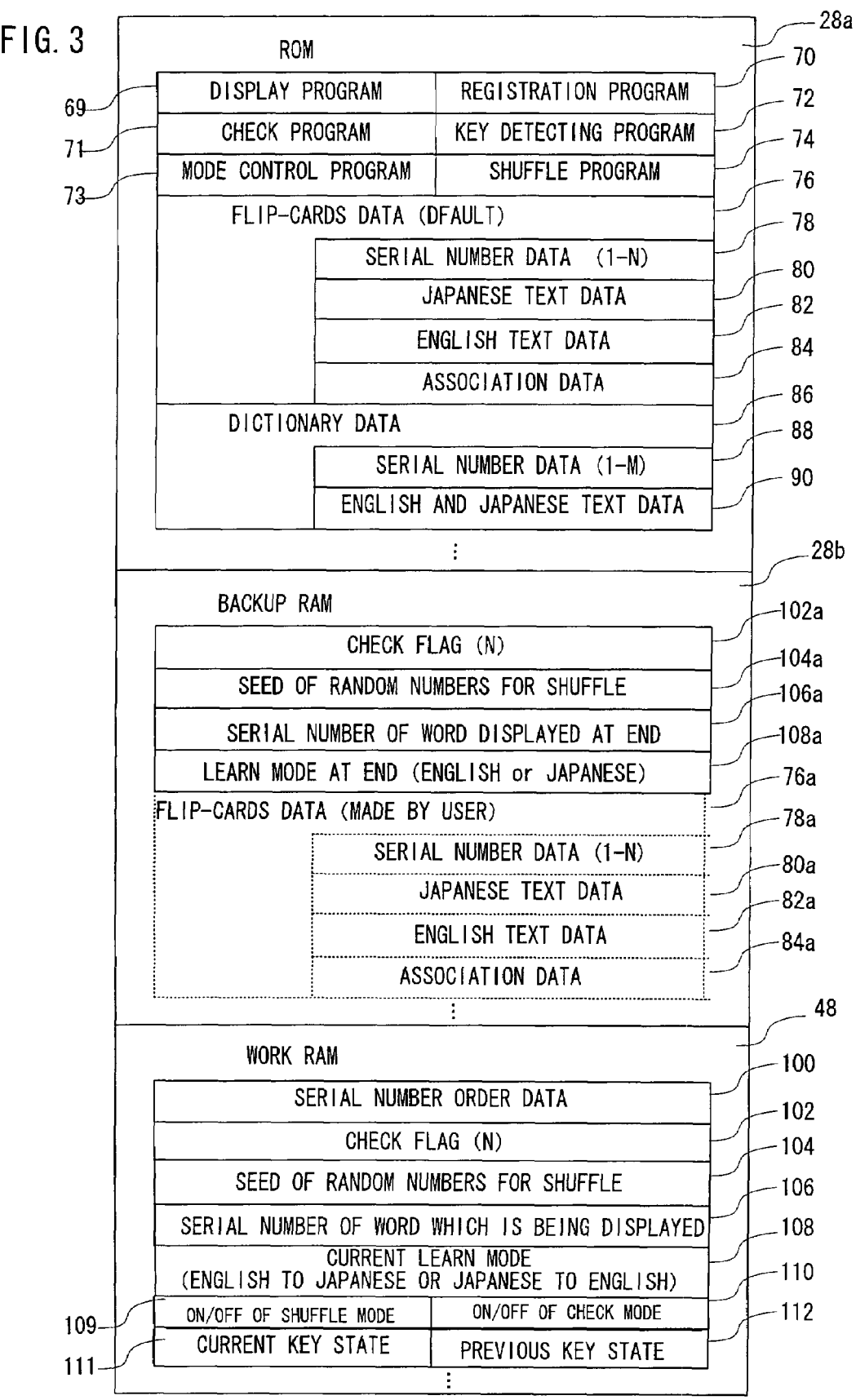
FIG. 3 is an illustrative view showing a memory map applied to FIG. 1 embodiment.

FIG. 3 shows a memory map in a case that learning by the flip-cards is performed in the game machine 10 described above. With reference to FIG. 3, the ROM 28*a* stores a display program 69, a registration program 70, a check program 71, a key detecting program 72, a mode controlling program 73, a shuffle program 74, flip-cards data 76, and dictionary data 86.

The display program 69 displays an image such as a flip-card, a dictionary, etc. on the LCD 12 and/or the LCD 14. The display processing by the display program 69 is executed at one frame per 1/30 seconds, for example, in an order according to serial number order data 100 stored in the work RAM 48. Additionally, an initial value of the serial number order data 100 is based on the order of serial number data 78 of the flip-cards (see FIG. 8(A)). Furthermore, each of N pieces of serial numbers (78) (N is one or more integer) constituting the serial number order data 100 is assigned a check flag (102) indicative of a checked state of a word corresponding to the serial number.

The registration program 70 registers an arbitrary word and the translation according to an input operation by a user. The flip-cards obtained by the registration processing, that is, the flip-cards made by the user are stored in the backup RAM 28*b*. The check program 71 accepts a check operation/cancel operation when a word corresponding to each of serial numbers is displayed, and turns the check flag 102 of each serial number on or off in response to the accepted operation.

The key detecting program 72 detects a state of the operation key 20. The key detecting processing by the key detecting program 72 is executed at one frame per 1/30 seconds, for example, and the detection result is stored in the work RAM 48. When the detection result is stored, the previous detection result, that is, the detection result before one frame is moved to another area within the work RAM 48. Accordingly, during execution of the reproduction processing, a current key state 111 and a previous key state 112 are normally held in the work RAM 48.

The mode controlling program 73 executes mode control processing according to an operation by the operation key 20. The mode control processing includes switching processing for switching a learn mode between an English to Japanese mode and a Japanese to English mode, a shuffle mode turning on-off processing, a check mode turning on-off processing, etc. The control result of the mode controlling program 73, that is, data indicative of a current learn mode 108, data indicative of on-off of a shuffle mode 109, data indicative of on-off of a check mode 110 are stored in the work RAM 48.

The shuffle program 74 generates a seed of random numbers for shuffle, and shuffles serial number order data 100 on the basis of the generated seed of random numbers. The seed of random numbers for shuffle 104 generated by the shuffle program 74 is stored in the work RAM 48.

The flip-cards data 76 includes serial number data (1-N) 78, Japanese text data 80, English text data 82, association data 84, etc. The serial number data 78 is an identifier for identifying N pieces of words registered in the flip-cards. In a case that one hundred words are registered in the flip-cards (N=100), the serial number data 78 is constituted by 100 serial numbers from 1 to 100.

The Japanese text data 80 is text data for displaying Japanese corresponding to the words registered in the flip-cards. The English text data 82 is text data for displaying English corresponding to the words registered in the flip-cards. The association data 84 is data for associating a word registered in the flip-cards with English and Japanese text data 90 in the dictionary. As association data 84, serial number data of a dictionary 88 is utilized. Additionally, the flip-cards data 76a made by a user stored in the backup RAM 28a also includes data similar to the data (78a-84a) included in the default flip-cards data 76.

Dictionary data 86 includes the serial number data (1 to M:M is an integer equal to or more than N, that is, $1 \leq N \leq M$) 88 and Japanese text data 90. The serial number data 88 is an identifier for identifying M pieces of words registered in the dictionary. If 1000 words are registered in the dictionary (M=1000), the serial number data 78 is constituted by 1000 serial numbers from 1 to 1000. The English and Japanese text data 90 is text data for displaying English (entry word) and Japanese (translation, explanation, and ruby (how to read), etc.) corresponding to a word registered in the dictionary. Additionally, the English and Japanese text data 90 may further include a language except for English and Japanese, symbols (phonetic symbol, for example), etc.

Here, a concrete example of the flip-cards data 76 (76a) and the dictionary data 86 are explained referring to FIG. 4 and FIG. 5. First, with reference to FIG. 4, in the flip-cards data 76, N pieces of serial numbers, that is, "1", "2", "3", . . . and "N" as serial number data 78, N pieces of English words respectively corresponding to the N pieces of serial numbers, that is, "abandon", "absorb", "abundant", . . . and "yield" as English data 80, N pieces of Japanese words (translation by Japanese) respectively corresponding to the N pieces of English words, that is, "Suteru", "Kyuusyuusuru", "Houhuna", . . . and "Sansyutusuru" in Japanese as Japanese data 82, and N pieces of serial numbers corresponding to the N sets of English and Japanese, that is, "5", "15", "20", . . . and "980" as association data 84 are registered. Additionally, the N pieces of serial numbers forming the association data 84 is selected from the M serial numbers forming the serial number data 88 in the dictionary.

Next, with reference to FIG. 5, in the dictionary data 86, M pieces of serial numbers, that is, "1", "2", "3", . . . and "M" as serial number data 88, and detailed information of M items corresponding to these M pieces of serial numbers (English word as an entry word, Japanese word as a translation, Japanese indicative of pronunciation of the English word, etc.) as English and Japanese text data 90 are registered. The detailed information identified by a serial number "5" includes "abandon/Suteru, Akirameru (Japanese language), /Abandon (Japanese language in katakana)".

Returning to FIG. 3, when the display processing by the display program 72 is ended, a part of the information stored in the work RAM 48 at this point, that is, the check flag 102a, the seed of random numbers for shuffle 104a, the serial number of the displayed word 106a, and the display mode 108a (these are inclusively called "status information") are transferred to the backup RAM 28b. The status information (102a-108a) thus saved in the work RAM 48 is transferred to the work RAM 48 when the display processing is restarted.

When the English to Japanese mode is selected as a learn mode, a display image on the LCD 14 is changed as shown in FIG. 6(A)-FIG. 6(D) and FIG. 7 in response to an operation by the operation key 20.

First, with reference to FIG. 6(A), the display image of the LCD 14 includes a flip-card 200. In the English to Japanese mode, a first English word, that is, "abandon" corresponding to a serial number "1" is described at the right half of the flip-card 200 as an entry word, and a check state of the English word is shown at the left half. If a blacked square (called a "checked mark") is attached to the left of the "CHECK", the English word at the right of the "CHECK" has already been checked. Additionally, since a blank square (called "not-checked mark") is attached, "abandon" has not been checked yet.

If the lower side of the cross key 20a (that is, pushed portion a4) is pushed in a state of FIG. 6(A), the display screen is changed as shown in FIG. 6(B). Referring to FIG. 6(B), at the right half of the flip-card 200, Japanese corresponding to "abandon", that is, "Suteru" (Japanese language) is described. The display shown in FIG. 6(B) is only displayed when the lower side of the cross key 20a is pushed. After cancellation of the cross key 20a, the screen shown in FIG. 6(B) returns to that in FIG. 6(A).

When the L button 20L is pushed in a state of FIG. 6(A), the display screen changes to that as shown in FIG. 6(C). In the flip-card 200 shown in FIG. 6(C), "abandon" and the checked mark are described, and this makes it possible to notify that "abandon" has already been checked.

If the right side (that is, pushed portion a2) of the cross key 20a is pushed in a state of FIG. 6(C) (or state of FIG. 6(A)), the display screen is changed to that as shown in FIG. 6(D). In the flip-card 200 of FIG. 6(D), a next English word corresponding to a serial number "2", that is, "absorb" is described. Furthermore, if the left side (that is, pushed portion a1) of the cross key 20a is pushed, the screen returns to that of the previous word.

Figure 7:
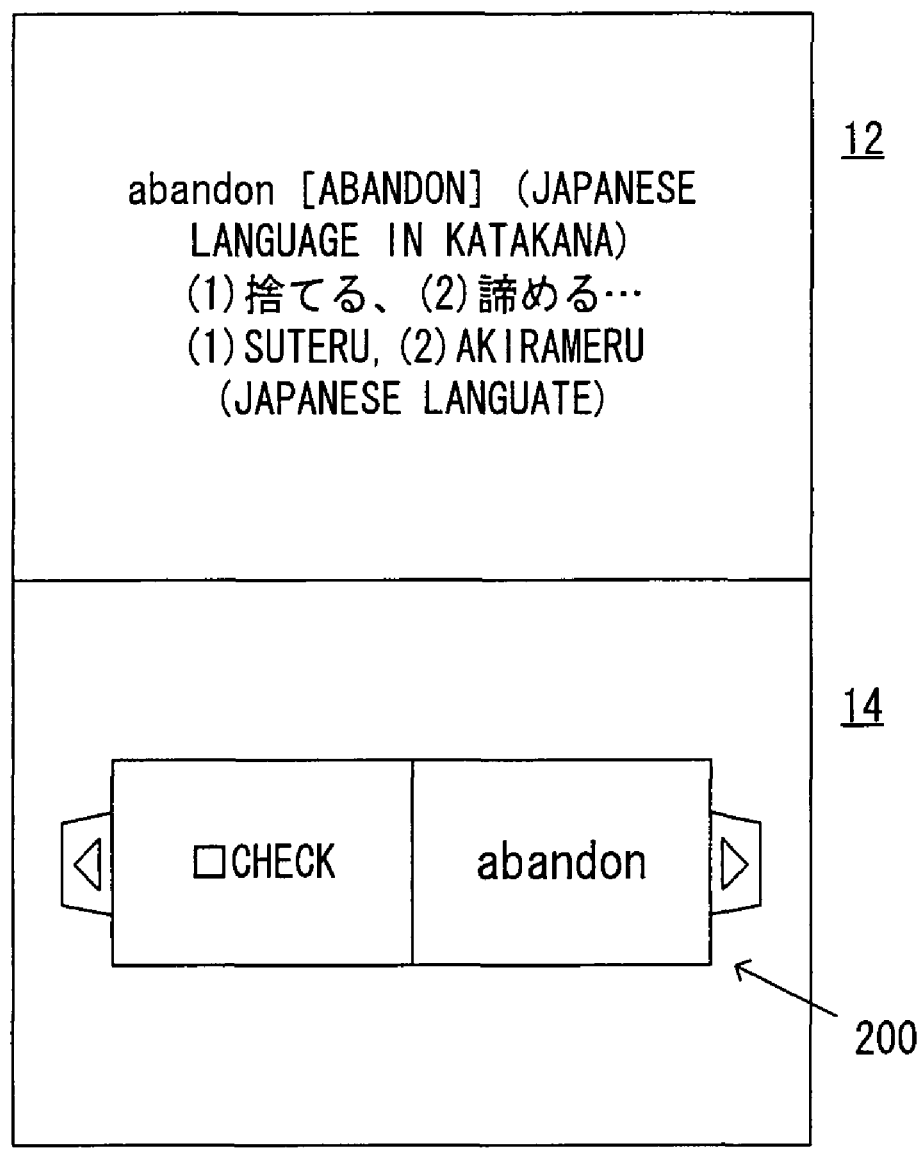
FIG. 7 is an illustrative view showing another example of the LCD display applied to FIG. 1 embodiment.

Additionally, if the upper side (that is, pushed portion a3) of the cross key 20a is pushed in a state of FIG. 6(A), a screen shown in FIG. 7 is displayed on the LCD 12. On the display screen of the LCD 12, detailed information corresponding to "abandon" described in the flip-card 200 of the LCD 14, that is, "abandon/Suteru, Akirameru (Japanese language)/abandon (Japanese language in katakana)" identified by a serial number "5" in the dictionary are described. Also, when the upper side of the cross key 20*a* is pushed, the display screen of the LCD 14 is not changed at all. The detailed information on the LCD 12 continues to be displayed after cancellation of the pressing operation of the upper side of the cross key 20*a*. The update of the detailed information is executed when pressing operation of the upper side of the cross key 20*a* is performed in a state that another English word is displayed.

Thus, when viewing a displayed English word, if the user memorizes the Japanese translation well, he or she makes a check operation with the L button 20L, and if the user is not sure to memorize it, he or she can view the Japanese translation by an operation of pressing the lower side of the cross key 20*a*. Thereafter, if the operation of pressing the lower side thereof is canceled, the same English word is displayed again to allow the user to confirm whether or not he or she memorizes the English word.

Thus, only during execution of an operation of pressing the lower side of the cross key 20*a*, the English word which is being displayed is replaced with the Japanese translation, and therefore, by quickly executing and cancelling the operation of pressing the lower side of the cross key 20*a*, during display of a certain English word, it is possible to catch a glimpse of the Japanese translation. Therefore it is possible to realize an effective learning of English words.

Furthermore, in a case that the Japanese to English mode is selected as a learn mode, a Japanese translation is first displayed as shown in FIG. 16(A)-FIG. 16(D), and only during execution of the operation of pressing the lower side of the cross key 20*a*, the Japanese translation which is being displayed is replaced with the English word. Processing of checking a memorized word, and displaying the dictionary information are the same as that in a case that the English to Japanese mode is selected. The English to Japanese mode and the Japanese to English mode can be switched, so that it is possible to perform a more effective learning of English words.

Furthermore, the checked English word is eliminated from the flip-card in response to turning-on the check mode. More specifically, as a result of a check operation when "abandon" is displayed, a check flag of the serial number "1" forming the order of serial numbers 100 is changed from OFF to ON as shown in FIG. 8(A). When the check mode is turned on in this state, the serial number "1" with the check flag turned on is deleted from the order of serial numbers 100 as shown in FIG. 8(B). Consequently, only the English word which has not been memorized yet is displayed, enhancing the effectiveness.

Also, an order of displaying the English words registered in the flip-cards is changed at random by turning the shuffle mode on. More specifically, the order of the serial numbers 100 shown in FIG. 8(A) is changed as shown in FIG. 9(A), for example, by shuffle processing to be executed in response to a shuffle operation by the select switch 20*c*. By changing a displaying order of the English words at random, it is possible to perform learning of English words more effectively. Also, in a case that the check mode is turned on after shuffling, the serial number with the check flag turned-on is deleted from the order of serial numbers 100 (see FIG. 9(A).)

Furthermore, if the flip-cards are made by the user, a desired English word and the. Japanese translation are registered in a manner shown in FIG. 10(A) and FIG. 10(B). With reference to FIG. 10(A), when a registration mode is first selected, a flip-card and a dictionary are displayed on the LCD 12 and on the LCD 14, respectively. The user scrolls the dictionary screen by operating the cross key 20*a*, and selects a desired English word ("abandon", here) in the dictionary with the stick or the like 24. The selection operation is detected by the touch panel 22. The selected English word is displayed on the flip-card of the LCD 12, and the text data corresponding to the selected English word is stored in the backup RAM 28*b* as English text data 82*a*.

When the selected English word, that is, "abandon" is displayed on the LCD 12, the user selects the Japanese translation assigned to "abandon" with the stick or the like 24 as shown in FIG. 10(B). In the dictionary, a plurality of Japanese words like "Suteru", "Akirameru", etc. are described as a translation of "abandon", and "Suteru" shall be selected here. The selected Japanese translation, that is, "Suteru" is displayed in the flip-card of the LCD 12, and the text data corresponding to the selected Japanese translation is stored in the backup RAM 28*b* as Japanese text data 80*a*.

Thus, when a set of English and Japanese words, that is, "abandon" and "Suteru" are stored, serial number data (serial number "1" of the flip-card corresponding to "abandon", here) and association data (serial number "5" of the dictionary corresponding to "abandon") are assigned to the set of English and Japanese words. Thus, registering the set of words is completed. By repeating similar processing from this time, the flip-cards made by the user are completed.

Figure 11:
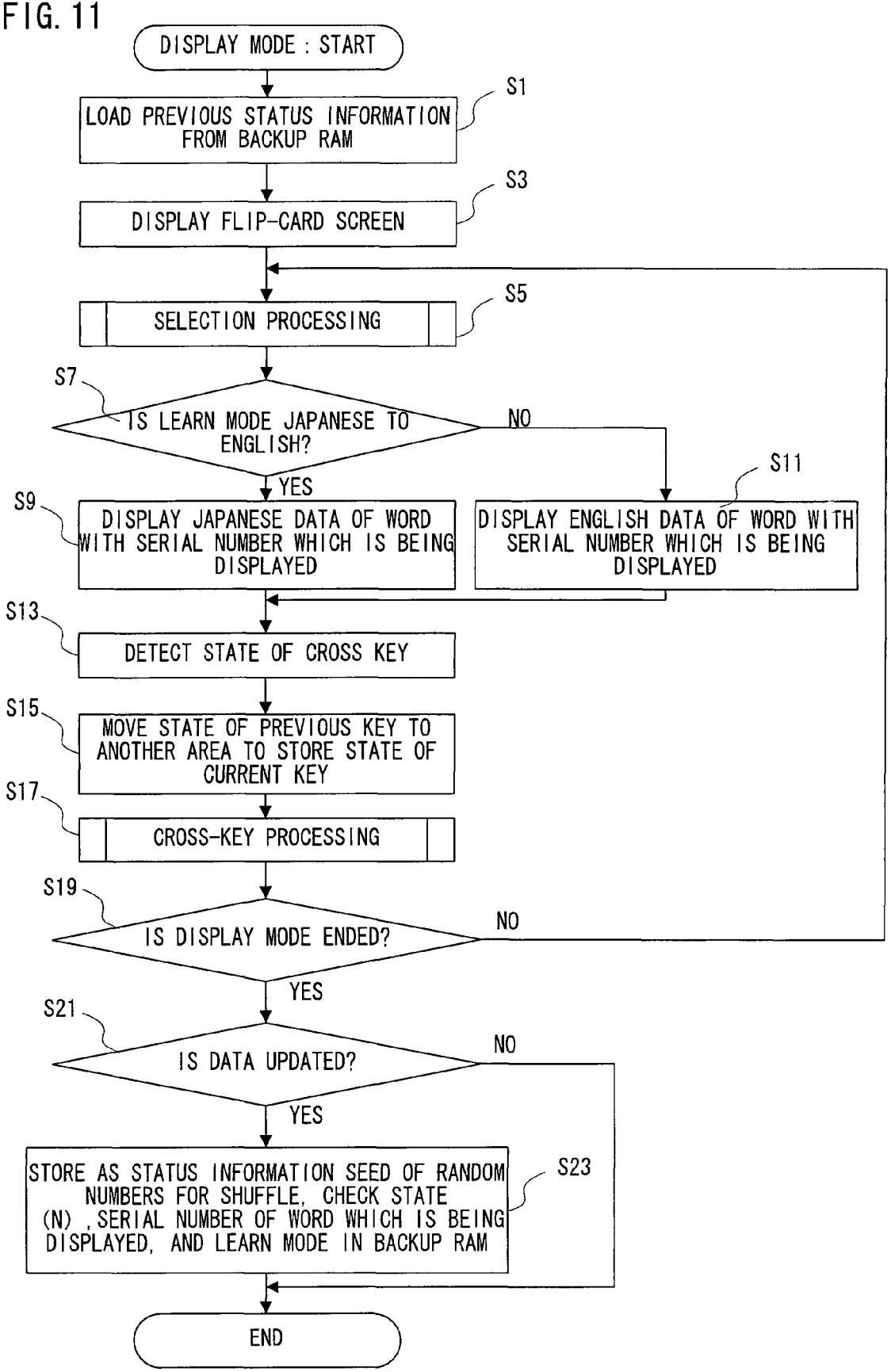
FIG. 11 is a flowchart showing a part of an operation of a CPU applied to FIG. 1 embodiment.
Figure 12:
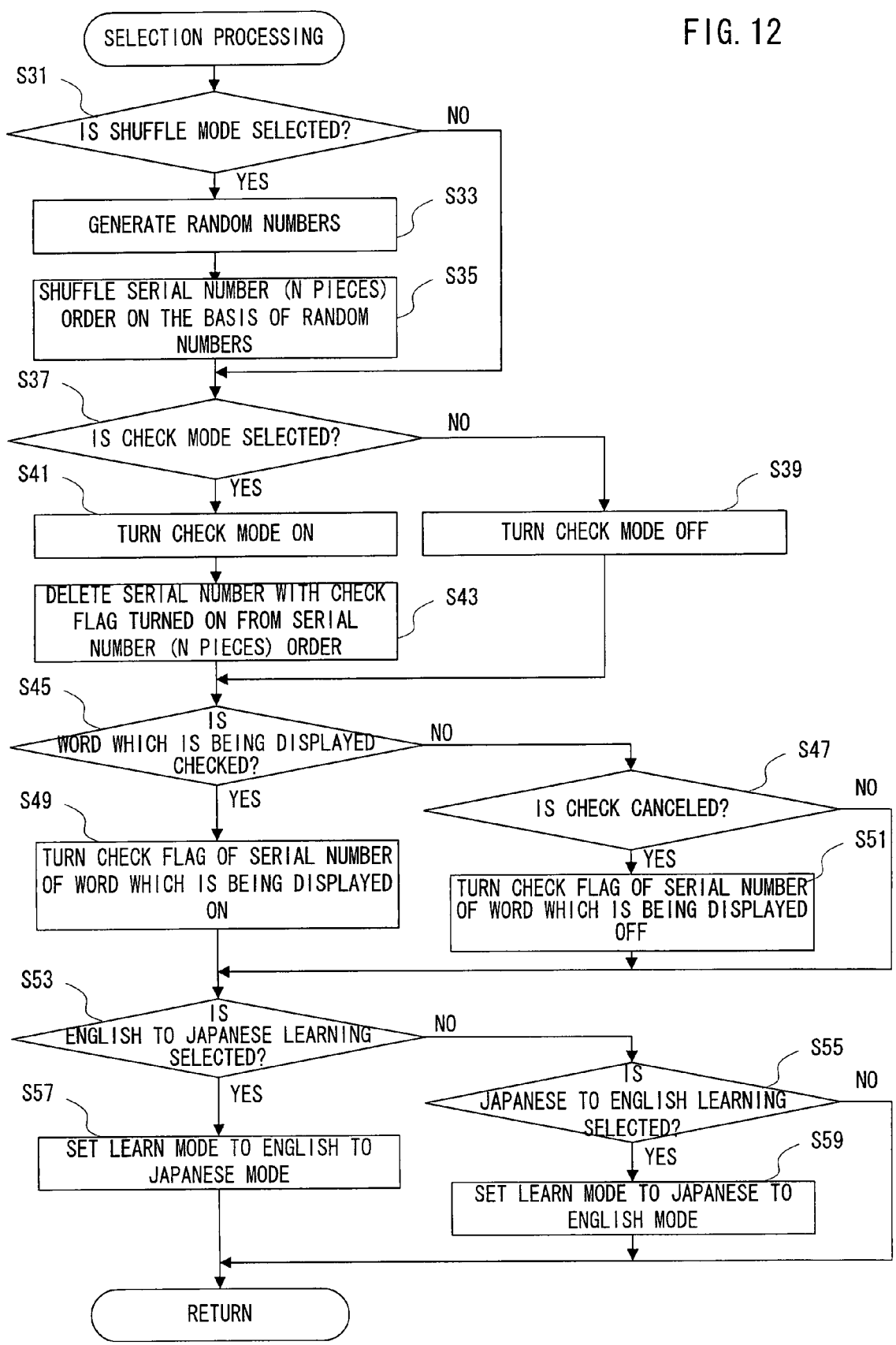
FIG. 12 is a flowchart showing another part of the operation of the CPU applied to FIG. 1 embodiment.
Figure 13:
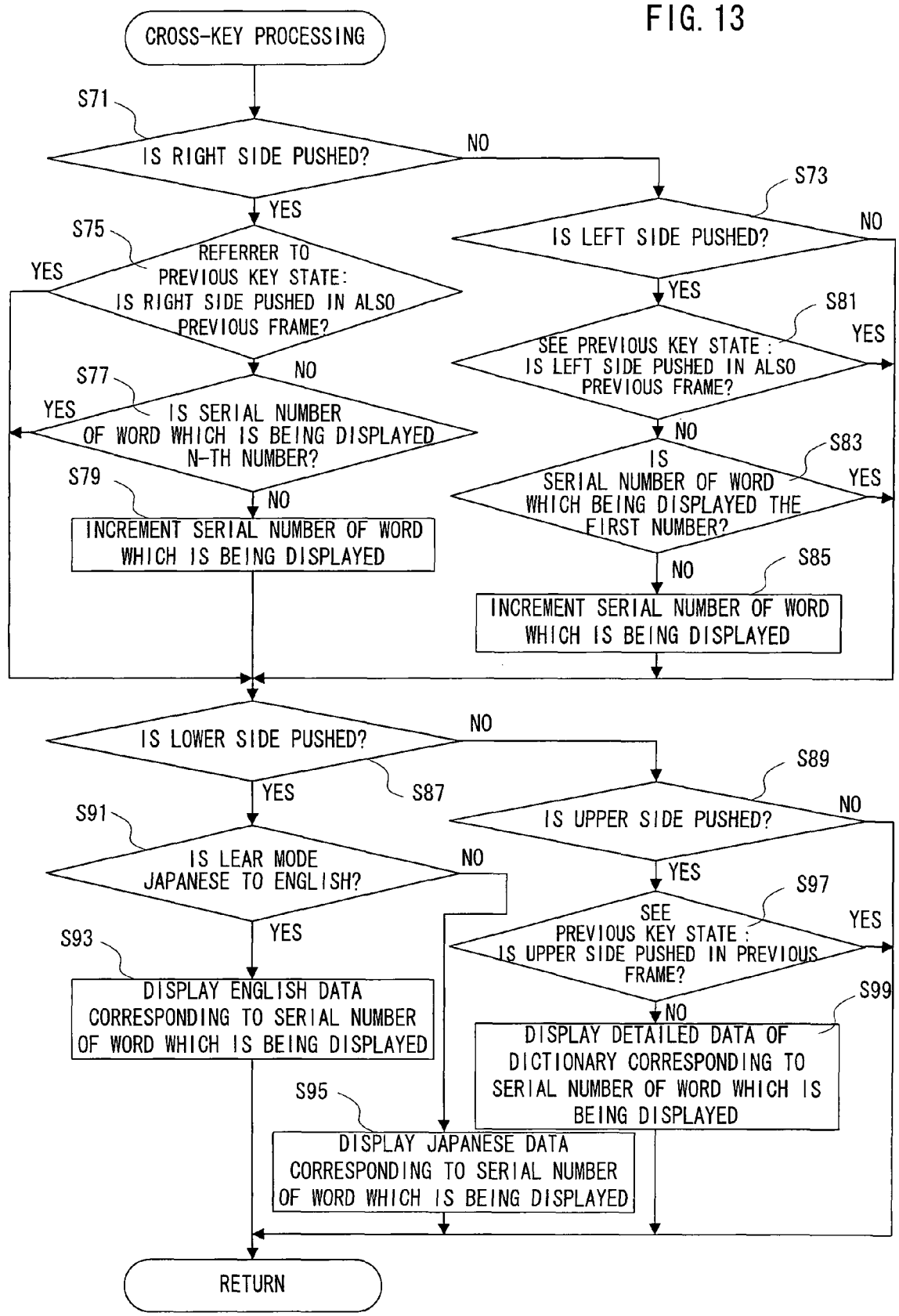
FIG. 13 is a flowchart showing the other part of the operation of the CPU applied to FIG. 1 embodiment.

When learning by means of the flip-cards is performed, that is, a display mode is selected, the CPU 42 executes processing according to a flowchart shown in FIG. 11-FIG. 13. It should be noted that the default flip-cards data 76 is utilized here.

First, with reference to FIG. 11, in a step S1, status information (102*a*-108*a*) held in the backup RAM 28*b* is loaded into the work RAM 48, and in a step S3, a flip-card screen is displayed on the LCD 14. Then, until the end of the display mode, loop processing in steps S5-S19 is executed per 1/30 seconds.

In the step S5, selection processing is executed. In the selection processing, turning on and off the shuffle mode, turning on and off the check mode, turning on and off the check flag, and switching of the learn mode (English to Japanese/Japanese to English) are performed. It should be noted that the detail of the selection processing is described later.

In the step S7, it is determined whether or not a current learn mode 108 in the work RAM 48 is the "Japanese to English" mode, and if "YES" here, the process shifts to the step S9 to display Japanese text data 80 corresponding to a serial number 106 of a word which is being displayed on the LCD 14. If "NO" in the step S7, that is, if it is the "English to Japanese" mode, English text data 82 corresponding to the serial number 106 of the word which is being displayed is displayed on the LCD 14 in the step S11. After display, the process shifts to the step S13.

In the step S13, a sate of the cross key 20*a* is detected through an I/F circuit 54. In the step S15, a previous key state 112 stored in a predetermined area within the work RAM 48 is moved to another area of the work RAM 48, and a detection result in the step S13, that is, a current key state 111 are stored in the above-described predetermined area.

In the step S17, cross-key processing is executed. In the cross-key processing, it is determined which portion of the cross key 20*a* is pushed, right, left, upper, and lower side to update the display screen on the basis of the determination result. This realizes functions like returning to a previous word, advancing to a next word, displaying detailed information, displaying a translation, and so forth. It should be noted that the detail of the cross-key processing is described later.

In the step S19, it is determined whether or not the display mode is ended, and if "NO", the process returns to the step S5. When a power off operation is performed, a registration mode is selected by the select switch 20*c*, and so forth, "YES" is determined by the step S19, and the process shifts to a step S21.

In the step S21, status information (102-108) in the work RAM 48 is compared with status information (102*a*-108*a*) in the backup RAM 28*b* to determine whether or not the data update is performed, and if "NO", the processing of the display mode is ended. If "YES" in the step S21, the status information (102-108) in the work RAM 48 is saved in the backup RAM 28*b* in a step S23, and the processing is ended.

The selection processing in the above-described step S5 is according to a subroutine shown in FIG. 12. Referring to FIG. 12, in a step S31, it is determined whether or not a shuffle mode is selected, and if "NO", the process proceeds to a step S37. When the shuffle mode is selected by the select switch 20*c*, the process shifts to a step S33 to generate a seed of random numbers for shuffle 104, and the serial number order data 100 is shuffled on the basis of the generated seed of random numbers 104 (see FIG. 8(A) and FIG. 9(A)) in a step S35. It should be noted that the seed of random numbers for shuffle 104 generated in the step S33 is stored in the work RAM 48. After completion of the shuffle processing, the process shifts to the step S37.

In the step S37, it is determined whether or not a check mode is selected, and if "NO", the check mode is turned off in a step S39. That is, the data 110 indicative of the check mode being turned off is written to the work RAM 48. Then, the process proceeds to determination processing in steps S45 and S47.

When the check mode is selected by the select switch 20*c*, the process shifts to a step S41 to turn the check mode on. That is, the data 110 indicative of the check mode being turned on is written to the work RAM 48. In a succeeding step S43, a serial number of a word with the check flag turned on is deleted from the serial number order data 100 (see FIG. 8(A) and FIG. 8(B) or see FIG. 9(A) and FIG. 9(B)). Then, the process proceeds to the determination processing in the steps S45 and S47.

In the step S45, it is determined whether or not the word which is being displayed is checked, and in the step S47, it is determined whether or not the check of the word which is being displayed is canceled. When a check operation is performed, that is, when the L button 20L is pushed in a state that a not-checked mark is displayed (see FIG. 6(A)), "YES" is determined in the step S45, and the process shifts to a step S49. In the step S49, a check flag of a serial number of the word which is being displayed is turned on (see FIG. 8(A)), and the process proceeds to determination processing in steps S53 and S55. On the other hand, when a cancellation operation is performed, that is, when the L button 20L is pushed in a state that the checked mark is displayed (see FIG. 6(C)), "YES" is determined in the step S47, and the process shifts to a step S51. In the step S51, the check flag of the serial number of the word which is being displayed is turned off, and the process proceeds to the determination processing in steps S53 and S55.

In the step S53, it is determined whether or not the "English to Japanese" mode is selected, and in the step S55, it is determined whether or not the "Japanese to English" mode is selected. If the "English to Japanese" mode is selected by the select switch 20*c*, "YES" is determined in the step S53, and the process shifts to a step S57. In the step S57, the learn mode is set to the "English to Japanese" mode. That is, data 108 indicative of the current learn mode being the "English to Japanese" mode is written to the work RAM 48. Then, the process is restored to the hierarchical upper level of the routine.

If the "Japanese to English" mode is selected by the select switch 20*c*, "YES" is determined in the step S55, and the process shifts to a step S59. In the step S59, the learn mode is set to the "Japanese to English" mode. That is, data 108 indicative of the current learn mode being the "Japanese to English" mode is written to the work RAM 48. Then, the process is restored to the hierarchical upper level of the routine.

The cross-key processing in the afore-mentioned step S5 is according to a subroutine shown in FIG. 13. Referring to FIG. 13, in a step S71, it is determined whether or not the pushed position is the right side of the cross key 20*a* on the basis of the current key state 111, and it is determined whether or not the pushed position is the left side of the cross key 20*a* on the basis of the current key state 111 in a step S73. If "NO" in both of the steps S71 and S73, the process proceeds to a upper and lower sides determination processing in steps S87 and S89.

If "YES" in the step S71, the process shifts to a step S75 to determine the right side is pushed in the previous frame by referring to the previous key state 112 in the work RAM 48. If "YES" here, the process proceeds to the upper and lower sides determination processing in the steps S87 and S89. If "NO" in the step S75, the process shifts to a step S77 to determine whether or not the serial number 106 of the word which is being displayed is the N-th number. If "YES" here, the process proceeds to the upper and lower sides determination processing in the steps S87 and S89. If "NO" in the step S77, the serial number 106 of the word which is being displayed is incremented in a step S79, and then, the process proceeds to the upper and lower sides determination processing in the steps S87 and S89.

If "YES" in the step S73, the process shifts to a step S81 to determine whether or not the left side is pushed in also the previous frame by referring the previous key state 112. If "YES" here, the process proceeds to the upper and lower sides determination processing in the steps S87 and S89. If "NO" in the step S81, the process shifts to a step S83 to determine whether or not the serial number 106 of the word which is being displayed is the first number. If "YES" here, the process proceeds to the upper and lower sides determination processing in the steps S87 and S89. If "NO" in the step S83, the serial number 106 of the word which is being displayed is decremented in a step S85, and then, the process proceeds to the upper and lower sides determination processing in the steps S87 and S89.

In the step S87, it is determined whether or not the pushed position is the lower side of the cross key 20*a*, and in the step S89, it is determined whether or not the pushed position is the upper side of the cross key 20*a*. If "NO" in both of the steps S87 and S89, the process is restored to the hierarchical upper level of the routine. If "YES" in the step S87, the process shifts to a step S91 to determine whether or not the current learn mode 108 is the "Japanese to English" mode. If "YES" here, the English text data 82 corresponding to the serial number 106 of the word which is being displayed is displayed on the LCD 14 in a step S93 while if "NO", that is, if the current learn mode 108 is the "English to Japanese" mode, the Japanese text data 80 corresponding to the serial number 106 of the word which is being displayed is displayed on the LCD 14 in a step S95. Then, the process is restored to the hierarchical upper level of the routine.

If "YES" in the step S89, the process shifts to a step S97 to determine whether or not the upper side is pushed in also the previous frame by referring to the previous key state 112. If "YES" here, the process is restored to the hierarchical upper level of the routine, and if "NO", the detailed information of the dictionary corresponding to the serial number 106 of the word which is being displayed, that is, the English and Japanese text data 90 is displayed on the LCD 14 in a step S99, and then, the process is restored to the hierarchical upper level of the routine.

Figure 14:
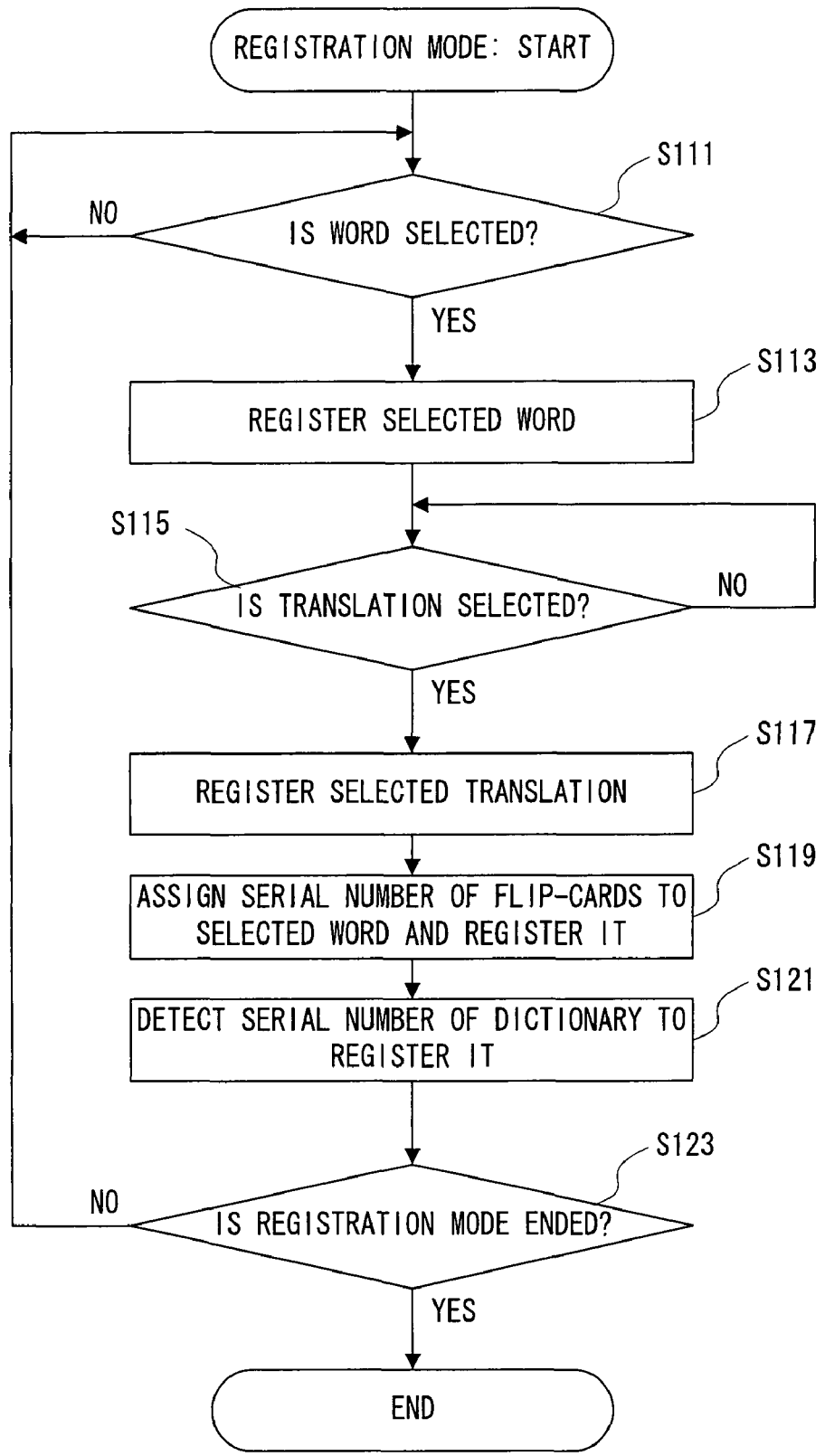
FIG. 14 is a flowchart showing a further part of the operation of the PCPU applied to FIG. 1 embodiment.

When the flip-cards are made by the user, that is, when the registration mode is selected, the CPU 42 executes processing according to a flowchart in FIG. 14. Referring to FIG. 14, in a step S111, it is determined whether or not a word is selected. When a selection operation for selecting a desired word ("abandon", for example) on the dictionary screen is accepted by the touch panel 22 in a state the word registration screen and the dictionary screen shown in FIG. 10(A) are respectively displayed on the LCD 12 and the LCD 14, "YES" is determined in the step S111, and the process shifts to a step S113.

In the step S13, the text data corresponding to the selected word is registered in the flip card. More specifically, if the selected word is English, the corresponding English text data 82a is written to the backup RAM 28b, and if the selected word is Japanese, the corresponding Japanese text data 80a is written to the backup RAM 28b. If the word is thus registered, the process shifts to a step S115.

In the step S115, it is determined whether or not translation is selected. If a selection operation for selecting a desired translation ("Suteru", for example) on the dictionary screen is accepted by the touch panel 22 in which the translation registration screen and the dictionary screen shown in FIG. 10(B) are respectively displayed on the LCD 12 and the LCD 14, "YES" is determined in the step S115, and the process shifts to a step S117.

In the step S117, the text data corresponding to the selected translation is registered in the flip-cards. More specifically, if the selected translation is Japanese, the corresponding Japanese text data 80a is written to the backup RAM 28b, and if the selected word is English, the corresponding English text data 82a is written to the backup RAM 28b. If the translation is thus registered, the process shifts to a step S119.

In the step S119, a serial number ("1", for example) of the flip-cards is assigned to the word registered in the step S113, and serial number data 78a of the flip-cards indicative of the assigned serial number is written to the backup RAM 28b. In a succeeding step S121, a serial number ("5", for example) of the dictionary corresponding to the word registered in the step S113 is detected on the basis of the dictionary data 86 (see FIG. 5), and the detected serial number is written to the backup RAM 28b as association data 84a. When the serial number data 78a and the association data 84a are thus registered, the process shifts to a step S123.

In the step S123, it is determined whether or not the registration mode is ended, and if "NO", the process returns to the step S111. If a power-off operation is performed, or a reproduction mode is selected by the select switch 20c, and so forth, "YES" is determined in the step S123, and the processing for the registration mode is ended.

As understood from the above description, in this embodiment, the game machine 10 has the LCDs 12 and 14, the cross key 20a, and the memory 28. The memory 28 stores a plurality of word data and a plurality of translation data respectively corresponding to the plurality of word data. The computer (CPU core 42) of the game machine 10 displays at least one of the plurality of word data on the LCD 14, and makes an updating display by changing the word data which is being displayed on the LCD 14 to another word data in response to an push operation of the left or right side of the cross key 20a (operation of the pushed portion a1 or a2).

Furthermore, the translation data corresponding to the word data which is thus being displayed on the LCD 14 is displayed on the LCD 14 so as to be updated in place of the word data during accepting the push operation of the lower side (operation of the pushed portion a4) of the cross key 20a to cancelling the operation, and if the operation is cancelled, the word data which was displayed on the LCD 14 before accepting the operation is displayed by updating in place of the translation data which is being displayed on the LCD 14.

According to this embodiment, the word data displayed on the LCD 14 is updated to the corresponding translation data in response to a push operation of the lower side of the cross key 20a, and the translation data thus updatedly displayed is updated to the original word data by merely canceling the operation, reducing the number of operations, which realizes an effective learning.

In a case of utilizing actual flip-cards, when a translation on the reverse side is viewed, for example, two movements like turning over a sheet of paper to look the translation and returning the reversed paper are required, and in the conventional word learning device, at least two operations are also required. However, in this embodiment, in response to the push operation of the left or right side of the cross key 20a, word data is updatedly displayed, and the corresponding translation data is displayed in place of the word data during accepting the push operation of the cross key 20a to cancelling the press operation, and therefore, it is possible to provide a more conventional operation than that in a case of the actual flip-cards and the conventional word learning device. In addition, an operation of updating the display of the word data and an operation of updating the display to the translation data are performed with the cross key 20a, and therefore, it is possible to realize various updating displays with the game machine 10 held in one hand.

The memory 28 further stores a plurality of dictionary items respectively corresponding to a plurality of words, and the computer of the game machine 10 further displays on the LCD 12 dictionary data corresponding to the word which is being displayed on the LCD 14 when the upper side a3 of the cross key 20a is pushed (S99). Thus, a learning environment in combination with a dictionary is realized, allowing a more effective learning.

Furthermore, the computer of the game machine 10 further accepts an operation of inputting a set of desired word data and desired translation data (S111, S115), and stores the accepted set of word data and translation data in the memory 28 (S113, S117). This makes it possible to create flip-cards on which the desired word and the desired translation are described, capable of performing a further effective learning by means of the flip-cards made by the user.

Additionally, in this embodiment, when a desired word is registered in the flip-cards made by the user, the dictionary is displayed on the LCD 14 to select a desired word from the words described in the dictionary, but as shown in FIG. 15(A) and FIG. 15(B), an arbitrary word may be input by handwriting with the stick or the like 24. In this case, the ROM 28a further stores a handwritten character recognizing program (not illustrated). A touch locus according to a handwriting input operation is detected by the touch panel 22, and the detection result is recognized by the handwritten character recognizing program. The recognition result is verified with the Japanese to English text data 90 in the dictionary, and if there is a word matching the verification result, the word is registered in the flip-cards.

In addition, in this embodiment, by means of the single cross key 20*a*, direction instructing operations in the four directions like right, left, upper and lower directions are accepted, but by means of four switches arranged in a cross shape, similar operations may be accepted. It is preferable that the four switches are arranged at an interval suitable for an operation with one hand, especially, an operation with one thumb. Alternatively, by means of three switches arranged in a T shape or a single T-shaped key (not illustrated), direction instructing operations in left right and lower directions may be accepted. In this case, a function assigned to the upper side a3, that is, a call function of a dictionary item is assigned to another switch.

Additionally, in this embodiment, an explanation is made on a case that learning is performed by utilizing the flip-cards in which an English word and the Japanese translation are described, but an English word and its pronunciation (ruby (how to read) by written Japanese and a phonetic symbol) may be described in the flip-cards. In addition, a kanji character and its ruby (how to read), an era and a historical event, a chemical formula and a name of material, a question (calculation, quiz, etc.) and its answer, a picture (photography) of a flora, a fauna and a game character and their names, and etc. may be described. In brief, a first information group formed by a plurality of data and a second information group formed by a plurality of data respectively corresponding to the first information group are described in the flip-cards.

Additionally, in this embodiment, the data of the first information group and the data of the second information group are displayed in such a manner as to be described in a card, but they may be displayed in such a manner as to be displayed on one except for the card, or only the data of the first information group and the data of the second information group may be displayed.

In the above, an explanation is made by means of the game machine 10, but this invention can be applied to an information processor having a display for displaying information, an operator for accepting a direction instructing operation, and a memory for storing a first information group formed by a plurality of data and a second information group formed by a plurality of data respectively corresponding to the first information group, such as an electronic dictionary, a mobile phone terminal, a mobile information terminal (PDA).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory recording medium recording a display updating program for an information processor having a display for displaying information, an operator device which accepts an operation, and a memory storing a first information group formed by a plurality of data and a second information group formed by a plurality of data corresponding to the plurality of data of the first information group, wherein said display updating program causes a computer of said information processor to execute:

a first display process which generates a first display image representative of at least one of said plurality of data of said first information group on said display, a second display process which changes the first display image to a second display image representative of another one of said plurality of data of said first information group in response to a first operation by said operator device, and a third display process which displays at least one of the plurality of data of the second information group which corresponds to the at least one of said plurality of data of the first information group which is being displayed on said display by said first display process or to the another one of said plurality of data of said second display process in place of the at least one or the another one of said plurality of data of said first information group only during a period from accepting a second operation by said operator device to a canceling said second operation, wherein the second operation is performed by pressing a touch device or a button device on the operator device and the canceling of the second operation is performed by releasing the touch device or button device, and updatedly displaying on said display the at least one of or the at least another one of said plurality of data of said first information group which was displayed on said display upon the acceptance of said second operation in place of the data of said second information group which is being displayed on said display when said second operation is canceled.

2. A non-transitory recording medium recording a display updating program according to claim 1, wherein said data of the first information group is defined by a predetermined order, said second display process updatedly displays on said display the data of said first information group which is being displayed on said display by said first display process by being changed to a next one of the plurality of data of said first information group on the basis of said predetermined order and in response to said first operation, and said display updating program further causes said computer to execute a fourth display process to update the displaying on said display of the another one of the plurality of data of said first information group which is being displayed on said display by said second display process by changing the data being displayed to the prior at least one of the plurality of data of said first information group on the basis of said order in response to a third operation by said operator.

3. A non-transitory recording medium recording a display updating program according to claim 2, wherein said memory further stores a third information group formed by a plurality of data corresponding to the plurality of data of said first information group, and said display updating program causes said computer to execute a fourth display process to display the data of the third information group corresponding to the data of the first information group which is being displayed on said display when a fourth operation is accepted by said operator.

4. A non-transitory recording medium recording a display updating program according to claim 3, wherein said first, second, third and fourth operations are each a direction instructing operation, wherein the second operation corresponds to a direction opposite a direction corresponding to said first direction, said third direction operation corresponds to a direction opposite to a direction corresponding to said fourth direction, and the direction corresponding to said third direction is perpendicular to the direction corresponding to the first direction.

5. A non-transitory recording medium recording a display updating program according to claim 4, wherein said button device includes a cross key having a first end portion and a second end portion and said first operation is an operation of pushing said first end portion, said second operation is an operation of pushing said second end portion, said third operation is an operation of pushing said third end portion, and said fourth operation is an operation of pushing said fourth end portion.

6. A non-transitory recording medium recording a display updating program according to claim 1, wherein the plurality of data forming said first information group are a plurality of word data, and the plurality of data forming said second information group are a plurality of translation data corresponding to said plurality of word data.

7. A non-transitory recording medium recording a display updating program according to claim 3, wherein said third information group includes a plurality of dictionary data corresponding to said plurality of word data.

8. A non-transitory recording medium recording a display updating program according to claim 7, wherein each of said plurality of word data is described by one of a first language and a second language, and each of said plurality of translation data is described by the other of said first language and said second language.

9. A non-transitory recording medium recording a display updating program according to claim 8, wherein said display updating program further causes said computer to execute a switching process in which a switch is made from a description language of a word to be displayed by said first display process between said first language and said second language in response to a mode switching operation.

10. A non-transitory recording medium recording a display updating program according to claim 1, wherein said display updating program further causes said computer to execute an accepting process to accept an input operation of inputting a set of a desired first information group and a desired second information group, and a storing process to store the set of first information group and second information group accepted by said accepting process in said memory.

11. A non-transitory recording medium recording a display updating program of an information processing device having a display for displaying information, an operator input device for accepting an instruction operation, a non-transitory memory storing first information and second information corresponding to said first information, wherein said display updating program causes a computer of said information processing device to execute:
 a mode setting process to set any one of a first mode and a second mode,
 a first display process to generate a displays of said first information on said display when said first mode is set by said mode setting process,
 a second display process to generate a display of said second information on said display when said second mode is set by said mode setting process,
 a third display process which, when an instruction operation is accepted by said operator in a state that said first information is being displayed on said display by said first display process, displays said second information on said display only during a period from accepting said instruction operation to cancelling said instruction operation, wherein the instruction operation includes pressing a touch device or a button device of the information processing device and the cancelling of the instruction operation includes the release of the touch device or the button device, and
 a fourth display process which, when an instruction operation is accepted by said operator input device while said second information is being displayed on said display by said second display process, displays said first information on said display only during a period from accepting said instruction operation to cancelling said instruction operation, wherein the instruction operation includes pressing the touch device or the button device and the cancelling of the instruction operation includes the release of the touch device or the button device.

12. A display updating apparatus comprising:
a display displaying information;
an operator input device for accepting a operation;
a non-transitory memory for storing a first information group formed by a plurality of data, and a second information group formed by a plurality of data corresponding to the plurality of data of the first information group;
a first display process of displaying at least one of said plurality of data of said first information group on said display, wherein the at least one of said plurality of data is less than an entirety of the plurality of data;
a second display process of updating said display by changing the at least one of said one of said data of said first information group to another data of said first information group in response to a first operation inputted to said operator input device, and
a third display process of displaying on said display data of the second information group corresponding to the at least one of said data of the first information group displayed by said first display process or said another data displayed by said second display process, wherein said data of the second information group is displayed only during a period from the operator input device accepting a second operation to cancel said second operation, wherein the second operation includes pressing a touch device or a button device on the operator input device and the cancelling of the second operation includes the release of the touch device or the button device, and
updatedly displaying on said display the data of said first information group which was displayed on said display before accepting said second operation in place of the data of said second information group which is being displayed on said display when said second operation is canceled.

13. An information processing apparatus comprising:
a display that displays information generated by a computer in the apparatus;
an operator input device for accepting an instruction operation;
a non-transitory memory for storing first information and second information corresponding to said first information;
a mode setting input device for setting any one of a first mode and a second mode,
the computer executing a program stored in the memory, the program causing the apparatus to:
display said first information on said display when said first mode is set by said mode setting input device;
display said second information on said display when said second mode is set by said mode setting input device,
display, in response to an instruction operation is accepted by said operator input device while said first information is being displayed, said second information on said display only during a period from accepting said instruction operation to cancelling the instruction operation, wherein the instruction operation includes pressing a touch device or the button device on the operator input device and the cancelling of the instruction operation includes the release of the touch device or the button device; and display, in response to the cancellation of the instruction, said first information on said display.

14. A non-transitory recording medium recording an information display program for execution by an information processor generating information to be displayed on a display, an operator input device accepting an operation, and a non-transitory memory storing a plurality of first information units and a plurality of second information units corresponding to said plurality of first information units, wherein said information display program causes the information processor to execute:
- a first display process which generates sequential displays of said plurality of first information units on said display in response to a first operation indicative of a first direction repeatedly accepted by said operator input device, and
- a second display process to generate a display of a unit of said second information units corresponding to the first information unit which is displayed on said display only during a period from accepting a second operation inputted to said operator input device to accepting a cancellation of said second operation, wherein the second operation includes pressing a touch device or the button device on the operator input device and the cancelling of the instruction operation includes the release of the touch device or the button device, and
- displays the first information unit again in response to the cancellation of second direction instruction operation.

15. A method to display information units from a first group of information units and a second group of information units on a display of an information processing device including a processor, an operator input device and a non-transitory storage medium, wherein the information units in the second group of information units each correspond to a respective information unit or units in the first group of information units, and the storage medium includes an executable program which, when executed by the processor, causes the information processing device to:
- select a first unit of the first group of information units, wherein the first unit is one of a plurality of selectable information units stored in the first group of information units;
- display the selected first unit;
- display a first unit of the second group of information units wherein the first unit of the second group corresponds to the displayed selected first unit, wherein the first unit of the second group of information units is displayed in response to a second command entered to the operator input device, and the first unit of the second group is displayed while the selected first unit is displayed or is substituted for the display of the selected first unit,
- select another unit of the first group of information units in response to a first command entered to the operator input device and changing the display from the selected first unit to the selected another unit, and
- wherein the first unit of the second group of information units is displayed only during a period from the entry of the second command and a cancelation of the second command, wherein the second command is inputted by pressing a touch device or the button device on the operator input device and the cancelling of the second command includes releasing the touch device or the button device.

16. A system to display information units from a first group of information units and a second group of information units on a display of an information processing device including a processor, an operator input device and a non-transitory storage medium, wherein the information units in the second group of information units correspond to a respective information unit or units in the first group of information units, and the storage medium includes an executable program which, when executed by the processor, causes the information processing device to:
- select a first unit of the first group of information units, wherein the first unit is one of a plurality of selectable information units stored in the first group of information units;
- display the selected first unit;
- display a first unit of the second group of information units wherein the first unit of the second group corresponds to the displayed selected first unit, wherein the first unit of the second group of information units is displayed in response to a second command entered to the operator input device, and the first unit of the second group is displayed while the selected first unit is displayed or is substituted for the display of the selected first unit, and
- select another unit of the first group of information units in response to a first command entered to the operator input device and changing the display from the selected first unit to the selected another unit, and
- wherein the first unit of the second group of information units is displayed only during a period from the entry of the second command and to a cancelation of the second command, wherein the instruction operation includes pressing a touch device or the button device on the operator input device and the cancelling of the instruction operation includes releasing the touch device or the button device.

17. A non-transitory recording medium recording a display updating program of an information processing device having a display including a first display screen and a second display screen, an operator input device for accepting an instruction operation, a non-transitory memory storing first information and second information corresponding to said first information, wherein said display updating program causes a computer of said information processing device to execute:
- a mode setting process to set any one of a first mode and a second mode,
- a first display process to generate a displays on the first display screen of said first information on said display when said first mode is set by said mode setting process,
- a second display process to generate a display on the second display screen of said second information on said display when said second mode is set by said mode setting process,
- a third display process which, when an instruction operation is accepted by said operator in a state that said first information is being displayed on said first display screen by said first display process, displays said second information on said second display screen only during a period from accepting said instruction operation to cancelling said instruction operation, and
- a fourth display process which, when an instruction operation is accepted by said operator input device while said second information is being displayed on said second display screen by said second display process, displays said first information on said first display screen only during a period from accepting said instruction operation to cancelling said instruction operation.

18. A display updating apparatus comprising:
- a display including a first display screen and a second display screen;
- an operator input device for accepting a operation;

a non-transitory memory for storing a first information group formed by a plurality of data, and a second information group formed by a plurality of data corresponding to the plurality of data of the first information group;

a first display process of displaying at least one of said plurality of data of said first information group on said first display screen, wherein the at least one of said plurality of data is less than an entirety of the plurality of data;

a second display process of updating said display by changing the at least one of said one of said data of said first information group to another data of said first information group in response to a first operation inputted to said operator input device, and a third display process of displaying on said second display screen data of the second information group corresponding to the at least one of said data of the first information group displayed by said first display process or said another data displayed by said second display process, wherein said data of the second information group is displayed only during a period from the operator input device accepting a second operation to cancel said second operation, and updatedly displaying on said first display screen the data of said first information group which was displayed on said display before accepting said second operation in place of the data of said second information group which is being displayed on said display when said second operation is canceled.

19. An information processing apparatus comprising:

a display that displays information generated by a computer in the apparatus, wherein the display includes a first display screen and a second display screen;

an operator input device for accepting an instruction operation;

a non-transitory memory for storing first information and second information corresponding to said first information;

a mode setting input device for setting any one of a first mode and a second mode, the computer executing a program stored in the memory, the program causing the apparatus to:

display said first information on said first display screen when said first mode is set by said mode setting input device;

display said second information on said second display screen when said second mode is set by said mode setting input device, display, in response to an instruction operation is accepted by said operator input device while said first information is being displayed, said second information on said second display screen only during a period from accepting said instruction operation to cancelling the instruction operation.

20. A non-transitory recording medium recording an information display program for execution by an information processor generating information to be displayed on a first and second display screens, an operator input device accepting an operation, and a non-transitory memory storing a plurality of first information units and a plurality of second information units corresponding to said plurality of first information units, wherein said information display program causes the information processor to execute:

a first display process which generates sequential displays of said plurality of first information units on said first display screen in response to a first operation indicative of a first direction repeatedly accepted by said operator input device, and a second display process to generate a display of a unit of said second information units corresponding to the first information unit which is displayed on said second display screen only during a period from accepting a second operation inputted to said operator input device to accepting a cancellation of said second operation, and displays the first information unit again on the first display screen in response to the cancellation of second direction instruction operation.

21. A method to display information units from a first group of information units on a first display screen and a second group of information units on a second display screen by an information processing device including a processor, an operator input device and a non-transitory storage medium, wherein the information units in the second group of information units each correspond to a respective information unit or units in the first group of information units, and the storage medium includes an executable program which, when executed by the processor, causes the information processing device to:

select a first unit of the first group of information units, wherein the first unit is one of a plurality of selectable information units stored in the first group of information units;

display on the first display screen the selected first unit;

display on the second display screen a first unit of the second group of information units wherein the first unit of the second group corresponds to the displayed selected first unit, wherein the first unit of the second group of information units is displayed in response to a second command entered to the operator input device, and the first unit of the second group is displayed on the first display screen while the selected first unit is displayed or is substituted for the display of the selected first unit, select another unit of the first group of information units in response to a first command entered to the operator input device and changing the display from the selected first unit to the selected another unit, wherein the first unit of the second group of information units is displayed on the second display screen only during a period from the entry of the second command and a cancelation of the second command, and display on the first display screen the selected first unit in response to the cancellation of the second command.

22. A system to display information units from a first group of information units on a first display screen and a second group of information units on a second display screen of an information processing device including a processor, an operator input device and a non-transitory storage medium, wherein the information units in the second group of information units correspond to a respective information unit or units in the first group of information units, and the storage medium includes an executable program which, when executed by the processor, causes the information processing device to:

select a first unit of the first group of information units, wherein the first unit is one of a plurality of selectable information units stored in the first group of information units;

display on the first display screen the selected first unit;

display on the second display screen a first unit of the second group of information units wherein the first unit of the second group corresponds to the displayed selected first unit, wherein the first unit of the second group of information units is displayed on the second display screen in response to a second command entered to the operator input device, and the first unit of the second group is displayed while the selected first unit is displayed on the second display screen, and select another unit of the first group of information units in response to a first command entered to the operator input device and changing the display on the first display screen from the selected first unit to the selected another unit, wherein the first unit of the second group of information units is displayed on the second display screen only during a period from the entry of the second command and to a cancelation of the second command.

* * * * *